United States Patent [19]

Sato et al.

[11] Patent Number: 5,642,439

[45] Date of Patent: Jun. 24, 1997

[54] DIGITAL IMAGE PROCESSING METHOD SUITABLE FOR HALFTONE REPRESENTATION BASED ON DITHER PROCESS

[75] Inventors: Kei Sato, Atsugi; Noboru Murayama, Machida, both of Japan

[73] Assignee: Ricoh Company, Ltd., Tokyo, Japan

[21] Appl. No.: 387,213

[22] Filed: Feb. 13, 1995

Related U.S. Application Data

[63] Continuation of Ser. No. 101,719, Aug. 4, 1993, abandoned.

[30] Foreign Application Priority Data

| Aug. 10, 1992 | [JP] | Japan | 4-212762 |
| Aug. 26, 1992 | [JP] | Japan | 4-226751 |
| Feb. 5, 1993 | [JP] | Japan | 5-018267 |
| Jun. 23, 1993 | [JP] | Japan | 5-151983 |

[51] Int. Cl.$^6$ .................................................. G06K 9/40
[52] U.S. Cl. .......................... 382/254; 382/270; 358/457
[58] Field of Search ............................... 382/254, 268, 382/269, 267, 270, 298, 299; 358/455, 456, 457–460

[56] References Cited

U.S. PATENT DOCUMENTS

| 4,675,831 | 6/1987 | Ito et al. | 364/518 |
| 4,698,691 | 10/1987 | Suzuki et al. | 358/283 |
| 4,698,778 | 10/1987 | Ito et al. | 364/518 |
| 4,797,943 | 1/1989 | Murayama et al. | 382/54 |
| 4,910,603 | 3/1990 | Hirahara et al. | 358/457 |
| 4,974,067 | 11/1990 | Suzuki et al. | 358/75 |
| 5,005,139 | 4/1991 | Tung | 382/54 |
| 5,031,050 | 7/1991 | Chan | 358/457 |
| 5,091,976 | 2/1992 | Murayama | 382/56 |
| 5,105,280 | 4/1992 | Ogino et al. | 358/298 |
| 5,107,349 | 4/1992 | Ng et al. | 358/457 |
| 5,130,808 | 7/1992 | Kemmochi | 358/457 |
| 5,140,432 | 8/1992 | Chan | 358/455 |
| 5,166,809 | 11/1992 | Surbrook | 358/456 |
| 5,291,311 | 3/1994 | Miller | 358/457 |

FOREIGN PATENT DOCUMENTS

| 64-1992 | 1/1989 | Japan |
| 1-31753 | 4/1989 | Japan |
| 3-59622 | 6/1989 | Japan |

*Primary Examiner*—Yon J. Couso
*Attorney, Agent, or Firm*—Woodcock Washburn Kurtz Mackiewicz & Norris LLP

[57] ABSTRACT

A digital image processing method includes first through fifth steps. The first step is providing a first matrix pattern having a plurality of threshold values stored in a storage memory. The second step is defining a size of each of second matrix patterns based on a predetermined area of the first matrix pattern. The first matrix pattern is composed of the second matrix patterns each of which includes a partial set of the threshold values and has the defined size so that a line density of an output image is determined. The third step is reading two or more threshold values of one of a plurality of basic matrix patterns from the storage memory at specified addresses. Each second matrix pattern is composed of the basic matrix patterns each of which has two or more threshold values and corresponds to one pixel. The fourth step is comparing the digital image data relating to one pixel with the threshold values of the basic matrix pattern to produce a multilevel image signal based on the comparison result. The fifth step is outputting the multilevel image signal relating to one dot, so that each dot is represented by a plurality of tone levels determined by each basic matrix pattern.

13 Claims, 31 Drawing Sheets

MULTI - STRUCTURE DITHER MATRIX PATTERN

| 49 | 17 | 33 | 61 | 51 | 19 | 35 | 63 |
| 37 | 1 | 13 | 29 | 39 | 3 | 15 | 31 |
| 21 | 5 | 9 | 45 | 23 | 7 | 11 | 47 |
| 53 | 41 | 25 | 57 | 55 | 43 | 27 | 59 |
| 52 | 20 | 36 | 64 | 50 | 18 | 34 | 62 |
| 40 | 4 | 16 | 32 | 38 | 2 | 14 | 30 |
| 24 | 8 | 12 | 48 | 22 | 6 | 10 | 46 |
| 56 | 44 | 28 | 60 | 54 | 42 | 26 | 58 |

▭ ~ BASIC MATRIX PATTERN 3 (1 x 2)

▯ ~ MIDDLE MATRIX PATTERN 2 (4 x 4)

▢ ~ PARENT DITHER MATRIX PATTERN 1 (8 x 8)

FIG. 3

| 1,17,33 | 9,25,41 | 105,121,137 | 3,19,35 | 99,115,131 | 11,27,43 | 107,123,139 |
| 49,65,81 | 57,73,89 | 147,163,179 | 51,67,83 | 155,171,187 | 59,75,91 | 145,161,177 |
| 13,29,45 | 5,21,37 | 101,117,133 | 15,31,47 | 111,127,143 | 7,23,39 | 103,119,135 |
| 61,77,93 | 83,69,85 | 159,175,191 | 63,79,95 | 151,167,183 | 55,71,87 | 157,173,189 |
| 4,20,36 | 12,28,44 | 108,124,140 | 2,18,34 | 98,114,130 | 10,26,42 | 106,122,138 |
| 52,68,84 | 60,76,92 | 146,162,178 | 50,66,82 | 154,170,186 | 58,74,90 | 148,164,180 |
| 16,32,48 | 8,24,40 | 104,120,136 | 14,30,46 | 110,126,142 | 6,22,38 | 102,118,134 |
| 64,80,96 | 56,72,88 | 158,174,190 | 62,78,94 | 150,166,182 | 54,70,86 | 160,176,192 |

FIG. 5

| 6 | 22 | 52 | 57 | 64 | 48 | 16 | 8 | 6 | 22 | 52 | 57 | 64 | 48 | 16 | 8 |
|---|----|----|----|----|----|----|---|---|----|----|----|----|----|----|---|
| 14 | 30 | 33 | 41 | 49 | 40 | 32 | 24 | 14 | 30 | 33 | 41 | 49 | 40 | 32 | 24 |
| 46 | 38 | 25 | 9 | 19 | 27 | 35 | 54 | 46 | 38 | 25 | 9 | 19 | 27 | 35 | 54 |
| 62 | 55 | 17 | 1 | 3 | 11 | 43 | 59 | 62 | 55 | 17 | 1 | 3 | 11 | 43 | 59 |
| 63 | 47 | 15 | 7 | 5 | 21 | 51 | 58 | 63 | 47 | 15 | 7 | 5 | 21 | 51 | 58 |
| 50 | 39 | 31 | 23 | 13 | 29 | 34 | 42 | 50 | 39 | 31 | 23 | 13 | 29 | 34 | 42 |
| 20 | 28 | 36 | 53 | 45 | 37 | 26 | 10 | 20 | 28 | 36 | 53 | 45 | 37 | 26 | 10 |
| 4 | 12 | 44 | 60 | 61 | 56 | 18 | 2 | 4 | 12 | 44 | 60 | 61 | 56 | 18 | 2 |
| 6 | 22 | 52 | 57 | 64 | 48 | 16 | 8 | 6 | 22 | 52 | 57 | 64 | 48 | 16 | 8 |
| 14 | 30 | 33 | 41 | 49 | 40 | 32 | 24 | 14 | 30 | 33 | 41 | 49 | 40 | 32 | 24 |
| 46 | 38 | 25 | 9 | 19 | 27 | 35 | 54 | 46 | 38 | 25 | 9 | 19 | 27 | 35 | 54 |
| 62 | 55 | 17 | 1 | 3 | 11 | 43 | 59 | 62 | 55 | 17 | 1 | 3 | 11 | 43 | 59 |
| 63 | 47 | 15 | 7 | 5 | 21 | 51 | 58 | 63 | 47 | 15 | 7 | 5 | 21 | 51 | 58 |
| 50 | 39 | 31 | 23 | 13 | 29 | 34 | 42 | 50 | 39 | 31 | 23 | 13 | 29 | 34 | 42 |
| 20 | 28 | 36 | 53 | 45 | 37 | 26 | 10 | 20 | 28 | 36 | 53 | 45 | 37 | 26 | 10 |
| 4 | 12 | 44 | 60 | 61 | 56 | 18 | 2 | 4 | 12 | 44 | 60 | 61 | 56 | 18 | 2 |

FIG. 6

| 21 | 33 | 41 | 29 | 23 | 35 | 43 | 31 | 21 | 33 | 41 | 29 | 23 | 35 | 43 | 31 |
|----|----|----|----|----|----|----|----|----|----|----|----|----|----|----|----|
| 49 | 1  | 9  | 57 | 51 | 3  | 11 | 59 | 49 | 1  | 9  | 57 | 51 | 3  | 11 | 59 |
| 45 | 25 | 17 | 37 | 47 | 27 | 19 | 39 | 45 | 25 | 17 | 37 | 47 | 27 | 19 | 39 |
| 13 | 61 | 53 | 5  | 15 | 63 | 55 | 7  | 13 | 61 | 53 | 5  | 15 | 63 | 55 | 7  |
| 24 | 36 | 44 | 32 | 22 | 34 | 42 | 30 | 24 | 36 | 44 | 32 | 22 | 34 | 42 | 30 |
| 52 | 4  | 12 | 60 | 50 | 2  | 10 | 58 | 52 | 4  | 12 | 60 | 50 | 2  | 10 | 58 |
| 48 | 28 | 20 | 40 | 46 | 26 | 18 | 38 | 48 | 28 | 20 | 40 | 46 | 26 | 18 | 38 |
| 16 | 64 | 56 | 8  | 14 | 62 | 54 | 6  | 16 | 64 | 56 | 8  | 14 | 62 | 54 | 6  |
| 21 | 33 | 41 | 29 | 23 | 35 | 43 | 31 | 21 | 33 | 41 | 29 | 23 | 35 | 43 | 31 |
| 49 | 1  | 9  | 57 | 51 | 3  | 11 | 59 | 49 | 1  | 9  | 57 | 51 | 3  | 11 | 59 |
| 45 | 25 | 17 | 37 | 47 | 27 | 19 | 39 | 45 | 25 | 17 | 37 | 47 | 27 | 19 | 39 |
| 13 | 61 | 53 | 5  | 15 | 63 | 55 | 7  | 13 | 61 | 53 | 5  | 15 | 63 | 55 | 7  |
| 24 | 36 | 44 | 32 | 22 | 34 | 42 | 30 | 24 | 36 | 44 | 32 | 22 | 34 | 42 | 30 |
| 52 | 4  | 12 | 60 | 50 | 2  | 10 | 58 | 52 | 4  | 12 | 60 | 50 | 2  | 10 | 58 |
| 48 | 28 | 20 | 40 | 46 | 26 | 18 | 38 | 48 | 28 | 20 | 40 | 46 | 26 | 18 | 38 |
| 16 | 64 | 56 | 8  | 14 | 62 | 54 | 6  | 16 | 64 | 56 | 8  | 14 | 62 | 54 | 6  |

MULTI-STRUCTURE DITHER MATRIX PATTERN

~ BASIC MATRIX PATTERN 3 (1 x 2)

~ MIDDLE MATRIX PATTERN 2 (4 x 4)

~ PARENT DITHER MATRIX PATTERN 1 (8 x 8)

| 14 | 24 | 52 | 55 | 53 | 46 | 22 | 12 |
|----|----|----|----|----|----|----|----|
| 34 | 50 | 41 | 27 | 25 | 39 | 48 | 32 |
| 62 | 43 | 19 | 7  | 5  | 17 | 37 | 60 |
| 57 | 29 | 9  | 1  | 3  | 15 | 35 | 63 |
| 54 | 45 | 21 | 11 | 13 | 23 | 51 | 56 |
| 26 | 40 | 47 | 31 | 33 | 49 | 42 | 28 |
| 6  | 18 | 38 | 59 | 61 | 44 | 20 | 8  |
| 4  | 16 | 36 | 64 | 58 | 30 | 10 | 2  |

| | | | |
|---|---|---|---|
| 14/24 | 52/55 | 53/46 | 22/12 |
| 34/50 | 41/27 | 25/39 | 48/32 |
| 62/43 | 19/7 | 5/17 | 37/60 |
| 57/29 | 9/1 | 3/15 | 35/63 |
| 54/45 | 21/11 | 13/23 | 51/56 |
| 26/40 | 47/31 | 33/49 | 42/28 |
| 6/18 | 38/59 | 61/44 | 20/8 |
| 4/16 | 36/64 | 58/30 | 10/2 |

| 14/34 | 24/50 | 52/41 | 55/27 | 53/25 | 46/39 | 22/48 | 12/32 |
|-------|-------|-------|-------|-------|-------|-------|-------|
| 62/57 | 43/29 | 19/9  | 7/1   | 5/3   | 17/15 | 37/35 | 60/63 |
| 54/26 | 45/40 | 21/47 | 11/31 | 13/33 | 23/49 | 51/42 | 56/28 |
| 6/4   | 18/16 | 38/36 | 59/64 | 61/58 | 44/30 | 20/10 | 8/2   |

FIG. 12

PULSE WIDTH FOR 100% DUTY RATIO

PULSE WIDTH FOR 33% DUTY RATIO

PULSE WIDTH FOR 66% DUTY RATIO

PULSE WIDTH MODULATION STARTS AT LEFT EDGE OF DOT

PULSE WIDTH MODULATION STARTS AT CENTER OF DOT

PULSE WIDTH MODULATION STARTS AT RIGHT OF DOT

PIXEL CLOCK

| 49 | 17 | 33 | 61 | 51 | 19 | 35 | 63 |
|----|----|----|----|----|----|----|----|
| 37 | 1  | 13 | 29 | 39 | 3  | 15 | 31 |
| 21 | 5  | 9  | 45 | 23 | 7  | 11 | 47 |
| 53 | 41 | 25 | 57 | 55 | 43 | 27 | 59 |
| 52 | 20 | 36 | 64 | 50 | 18 | 34 | 62 |
| 40 | 4  | 16 | 32 | 38 | 2  | 14 | 30 |
| 24 | 8  | 12 | 48 | 22 | 6  | 10 | 46 |
| 56 | 44 | 28 | 60 | 54 | 42 | 26 | 58 |

☐ ~ BASIC MATRIX 3
▭ ~ MIDDLE MATRIX 2
■ ~ PARENT MATRIX 1

FIG. 33

| 49 | 17 | 33 | 61 | 51 | 19 | 35 | 63 |
|---|---|---|---|---|---|---|---|
| 37 | 1  | 13 | 29 | 39 | 3  | 15 | 31 |
| 21 | 5  | 9  | 45 | 23 | 7  | 11 | 47 |
| 53 | 41 | 25 | 57 | 55 | 43 | 27 | 59 |
| 52 | 20 | 36 | 54 | 50 | 18 | 34 | 62 |
| 40 | 4  | 16 | 32 | 38 | 2  | 14 | 30 |
| 24 | 8  | 12 | 48 | 22 | 6  | 10 | 46 |
| 56 | 44 | 28 | 60 | 54 | 42 | 26 | 58 |

FIG. 34

| 52 | 20 | 36 | 64 | 50 | 18 | 34 | 62 |
|---|---|---|---|---|---|---|---|
| 40 | 4  | 16 | 32 | 38 | 2  | 14 | 30 |
| 24 | 8  | 12 | 48 | 22 | 6  | 10 | 46 |
| 56 | 44 | 28 | 60 | 54 | 42 | 26 | 58 |
| 49 | 17 | 33 | 61 | 51 | 19 | 35 | 63 |
| 37 | 1  | 13 | 29 | 39 | 3  | 15 | 31 |
| 21 | 5  | 9  | 45 | 23 | 7  | 11 | 47 |

FIG. 35

| 51 | 19 | 35 | 63 | 49 | 17 | 33 | 61 |
|----|----|----|----|----|----|----|----|
| 39 | 3  | 15 | 31 | 37 | 1  | 13 | 29 |
| 23 | 7  | 11 | 47 | 21 | 5  | 9  | 45 |
| 55 | 43 | 27 | 59 | 53 | 41 | 25 | 57 |
| 50 | 18 | 34 | 62 | 52 | 20 | 36 | 64 |
| 38 | 2  | 14 | 30 | 40 | 14 | 16 | 32 |
| 22 | 6  | 10 | 46 | 24 | 8  | 12 | 48 |
| 54 | 42 | 26 | 58 | 56 | 44 | 28 | 60 |

FIG. 36

| 50 | 18 | 34 | 62 | 52 | 20 | 36 | 64 |
|----|----|----|----|----|----|----|----|
| 38 | 2  | 14 | 30 | 40 | 4  | 16 | 32 |
| 22 | 6  | 10 | 46 | 24 | 8  | 12 | 48 |
| 54 | 42 | 26 | 58 | 56 | 44 | 28 | 60 |
| 51 | 19 | 35 | 63 | 49 | 17 | 33 | 61 |
| 39 | 3  | 15 | 31 | 37 | 1  | 13 | 29 |
| 23 | 7  | 11 | 47 | 21 | 5  | 9  | 45 |
| 55 | 43 | 27 | 59 | 53 | 41 | 25 | 57 |

FIG. 37

| 49 | 17 | 33 | 61 | 51 | 19 | 35 | 63 | 49 | 17 | 33 | 61 | 51 | 19 | 35 | 63 |
|----|----|----|----|----|----|----|----|----|----|----|----|----|----|----|----|
| 37 | ≈ | 13 | 29 | 39 | ≈ | 15 | 31 | 37 | ≈ | 13 | 29 | 39 | ≈ | 15 | 31 |
| 21 | 5 | 9 | 45 | 23 | 7 | 11 | 47 | 21 | 5 | 9 | 45 | 23 | 7 | 11 | 47 |
| 53 | 41 | 25 | 57 | 55 | 43 | 27 | 59 | 53 | 41 | 25 | 57 | 55 | 43 | 27 | 59 |
| 52 | 20 | 36 | 64 | 50 | 18 | 34 | 62 | 52 | 20 | 36 | 64 | 50 | 18 | 34 | 62 |
| 40 | 4 | 16 | 32 | 38 | ≈ | 14 | 30 | 40 | 4 | 16 | 32 | 38 | ≈ | 14 | 30 |
| 24 | 8 | 12 | 48 | 22 | 6 | 10 | 46 | 24 | 8 | 12 | 48 | 22 | 6 | 10 | 46 |
| 56 | 44 | 28 | 60 | 54 | 42 | 26 | 58 | 56 | 44 | 28 | 60 | 54 | 42 | 26 | 58 |
| 49 | 17 | 33 | 61 | 51 | 19 | 35 | 63 | 49 | 17 | 33 | 61 | 51 | 19 | 35 | 63 |
| 37 | ≈ | 13 | 29 | 39 | ≈ | 15 | 31 | 37 | ≈ | 13 | 29 | 39 | ≈ | 15 | 31 |
| 21 | 5 | 9 | 45 | 23 | 7 | 11 | 47 | 21 | 5 | 9 | 45 | 23 | 7 | 11 | 47 |
| 53 | 41 | 25 | 57 | 55 | 43 | 27 | 59 | 53 | 41 | 25 | 57 | 55 | 43 | 27 | 59 |
| 52 | 20 | 36 | 64 | 50 | 18 | 34 | 62 | 52 | 20 | 36 | 64 | 50 | 18 | 34 | 62 |
| 40 | 4 | 16 | 32 | 38 | ≈ | 14 | 30 | 40 | 4 | 16 | 32 | 38 | ≈ | 14 | 30 |
| 24 | 8 | 12 | 48 | 22 | 6 | 10 | 46 | 24 | 8 | 12 | 48 | 22 | 6 | 10 | 46 |
| 56 | 44 | 28 | 60 | 54 | 42 | 26 | 58 | 56 | 44 | 28 | 60 | 54 | 42 | 26 | 58 |

FIG. 38

| 52 | 20 | 36 | 64 | 50 | 18 | 34 | 62 | 52 | 20 | 36 | 64 | 50 | 18 | 34 | 62 |
|----|----|----|----|----|----|----|----|----|----|----|----|----|----|----|----|
| 40 | 4 | 16 | 32 | 38 | ▦ | 14 | 30 | 40 | 4 | 16 | 32 | 38 | ▦ | 14 | 30 |
| 24 | 8 | 12 | 48 | 22 | 6 | 10 | 46 | 24 | 8 | 12 | 48 | 22 | 6 | 10 | 46 |
| 56 | 44 | 28 | 60 | 54 | 42 | 26 | 58 | 56 | 44 | 28 | 60 | 54 | 42 | 26 | 58 |
| 49 | 17 | 33 | 61 | 51 | 19 | 35 | 63 | 49 | 17 | 33 | 61 | 51 | 19 | 35 | 63 |
| 37 | ▦ | 13 | 19 | 39 | ▦ | 15 | 31 | 37 | ▦ | 13 | 19 | 39 | ▦ | 15 | 31 |
| 21 | 5 | 9 | 45 | 23 | 7 | 11 | 47 | 21 | 5 | 9 | 45 | 23 | 7 | 11 | 47 |
| 53 | 41 | 25 | 57 | 55 | 43 | 27 | 59 | 53 | 41 | 25 | 57 | 55 | 43 | 27 | 59 |
| 52 | 20 | 36 | 64 | 50 | 18 | 34 | 62 | 52 | 20 | 36 | 64 | 50 | 18 | 34 | 62 |
| 40 | 4 | 16 | 32 | 38 | ▦ | 14 | 30 | 40 | 4 | 16 | 32 | 38 | ▦ | 14 | 30 |
| 24 | 8 | 12 | 48 | 22 | 6 | 10 | 46 | 24 | 8 | 12 | 48 | 22 | 6 | 10 | 46 |
| 56 | 44 | 28 | 60 | 54 | 42 | 26 | 58 | 56 | 44 | 28 | 60 | 54 | 42 | 26 | 58 |
| 49 | 17 | 33 | 61 | 51 | 19 | 35 | 63 | 49 | 17 | 33 | 61 | 51 | 19 | 35 | 63 |
| 37 | ▦ | 13 | 19 | 39 | ▦ | 15 | 31 | 37 | ▦ | 13 | 19 | 39 | ▦ | 15 | 31 |
| 21 | 5 | 9 | 45 | 23 | 7 | 11 | 47 | 21 | 5 | 9 | 45 | 23 | 7 | 11 | 47 |
| 53 | 41 | 25 | 57 | 55 | 43 | 27 | 59 | 53 | 41 | 25 | 57 | 55 | 43 | 27 | 59 |

FIG. 39

| 51 | 19 | 35 | 63 | 49 | 17 | 33 | 61 | 51 | 19 | 35 | 63 | 49 | 17 | 33 | 61 |
|---|---|---|---|---|---|---|---|---|---|---|---|---|---|---|---|
| 30 | ☆ | 15 | 31 | 37 | ☆ | 13 | 29 | 30 | ☆ | 15 | 31 | 37 | ☆ | 13 | 29 |
| 23 | 7 | 11 | 47 | 21 | 5 | 9 | 45 | 23 | 7 | 11 | 47 | 21 | 5 | 9 | 45 |
| 55 | 43 | 27 | 59 | 53 | 41 | 25 | 57 | 55 | 43 | 27 | 59 | 53 | 41 | 25 | 57 |
| 50 | 18 | 34 | 62 | 52 | 20 | 36 | 64 | 50 | 18 | 34 | 62 | 52 | 20 | 36 | 64 |
| 38 | ☆ | 14 | 30 | 36 | 4 | 16 | 32 | 38 | ☆ | 14 | 30 | 36 | 4 | 16 | 32 |
| 22 | 6 | 10 | 46 | 24 | 8 | 12 | 48 | 22 | 6 | 10 | 46 | 24 | 8 | 12 | 48 |
| 54 | 42 | 26 | 58 | 56 | 44 | 28 | 60 | 54 | 42 | 26 | 58 | 56 | 44 | 28 | 60 |
| 51 | 19 | 35 | 63 | 49 | 17 | 33 | 61 | 51 | 19 | 35 | 63 | 49 | 17 | 33 | 61 |
| 30 | ☆ | 15 | 31 | 37 | ☆ | 13 | 29 | 30 | ☆ | 15 | 31 | 37 | ☆ | 13 | 29 |
| 23 | 7 | 11 | 47 | 21 | 5 | 9 | 45 | 23 | 7 | 11 | 47 | 21 | 5 | 9 | 45 |
| 55 | 43 | 27 | 59 | 53 | 41 | 25 | 57 | 55 | 43 | 27 | 59 | 53 | 41 | 25 | 57 |
| 50 | 18 | 34 | 62 | 52 | 20 | 36 | 64 | 50 | 18 | 34 | 62 | 52 | 20 | 36 | 64 |
| 38 | ☆ | 14 | 30 | 36 | 4 | 16 | 32 | 38 | ☆ | 14 | 30 | 36 | 4 | 16 | 32 |
| 22 | 6 | 10 | 46 | 24 | 8 | 12 | 48 | 22 | 6 | 10 | 46 | 24 | 8 | 12 | 48 |
| 54 | 42 | 26 | 58 | 56 | 44 | 28 | 60 | 54 | 42 | 26 | 58 | 56 | 44 | 28 | 60 |

FIG. 40

| 52 | 20 | 36 | 64 | 50 | 18 | 34 | 62 | 52 | 20 | 36 | 64 | 50 | 18 | 34 | 62 |
|---|---|---|---|---|---|---|---|---|---|---|---|---|---|---|---|
| 38 | ▨ | 14 | 30 | 40 | 4 | 16 | 32 | 38 | ▨ | 14 | 30 | 40 | 4 | 16 | 32 |
| 22 | 6 | 10 | 46 | 24 | 8 | 12 | 48 | 22 | 6 | 10 | 46 | 24 | 8 | 12 | 48 |
| 54 | 42 | 26 | 58 | 56 | 44 | 28 | 60 | 54 | 42 | 26 | 58 | 56 | 44 | 28 | 60 |
| 51 | 19 | 35 | 63 | 49 | 17 | 33 | 61 | 51 | 19 | 35 | 63 | 49 | 17 | 33 | 61 |
| 39 | ▨ | 15 | 31 | 37 | ▨ | 13 | 29 | 39 | ▨ | 15 | 31 | 37 | ▨ | 13 | 29 |
| 23 | 7 | 11 | 47 | 21 | 5 | 9 | 45 | 23 | 7 | 11 | 47 | 21 | 5 | 9 | 45 |
| 55 | 43 | 27 | 59 | 53 | 41 | 25 | 57 | 55 | 43 | 27 | 59 | 53 | 41 | 25 | 57 |
| 52 | 20 | 36 | 64 | 50 | 18 | 34 | 62 | 52 | 20 | 36 | 64 | 50 | 18 | 34 | 62 |
| 38 | ▨ | 14 | 30 | 40 | 4 | 16 | 32 | 38 | ▨ | 14 | 30 | 40 | 4 | 16 | 32 |
| 22 | 6 | 10 | 46 | 24 | 8 | 12 | 48 | 22 | 6 | 10 | 46 | 24 | 8 | 12 | 48 |
| 54 | 42 | 26 | 58 | 56 | 44 | 28 | 60 | 54 | 42 | 26 | 58 | 56 | 44 | 28 | 60 |
| 51 | 19 | 35 | 63 | 49 | 17 | 33 | 61 | 51 | 19 | 35 | 63 | 49 | 17 | 33 | 61 |
| 39 | ▨ | 15 | 31 | 37 | ▨ | 13 | 29 | 39 | ▨ | 15 | 31 | 37 | ▨ | 13 | 29 |
| 23 | 7 | 11 | 47 | 21 | 5 | 9 | 45 | 23 | 7 | 11 | 47 | 21 | 5 | 9 | 45 |
| 55 | 43 | 27 | 59 | 53 | 41 | 25 | 57 | 55 | 43 | 27 | 59 | 53 | 41 | 25 | 57 |

FIG. 43
PRIOR ART

| 35 | 63 | 49 | 17 | 33 | 61 | 51 | 19 | 35 | 63 | 49 | 17 | 33 | 61 | 51 | 19 |
|----|----|----|----|----|----|----|----|----|----|----|----|----|----|----|----|
| 15 | 31 | 37 |    | 13 | 29 | 39 |    | 15 | 31 | 37 |    | 13 | 29 | 39 |    |
| 11 | 47 | 21 | 5  | 9  | 45 | 23 | 7  | 11 | 47 | 21 | 5  | 9  | 45 | 23 | 7  |
| 27 | 59 | 53 | 41 | 25 | 57 | 55 | 43 | 27 | 59 | 53 | 41 | 25 | 57 | 55 | 43 |
| 34 | 62 | 52 | 20 | 36 | 64 | 50 | 18 | 34 | 62 | 52 | 20 | 36 | 64 | 50 | 18 |
| 14 | 30 | 40 | 4  | 16 | 32 | 38 |    | 14 | 30 | 40 | 4  | 16 | 32 | 38 |    |
| 10 | 46 | 24 | 8  | 12 | 48 | 22 | 6  | 10 | 46 | 24 | 8  | 12 | 48 | 22 | 6  |
| 26 | 58 | 56 | 44 | 28 | 60 | 52 | 42 | 26 | 58 | 56 | 44 | 28 | 60 | 52 | 42 |
| 35 | 63 | 49 | 17 | 33 | 61 | 51 | 19 | 35 | 63 | 49 | 17 | 33 | 61 | 51 | 19 |
| 15 | 31 | 37 |    | 13 | 29 | 39 |    | 15 | 31 | 37 |    | 13 | 29 | 39 |    |
| 11 | 47 | 21 | 5  | 9  | 45 | 23 | 7  | 11 | 47 | 21 | 5  | 9  | 45 | 23 | 7  |
| 27 | 59 | 53 | 41 | 25 | 57 | 55 | 43 | 27 | 59 | 53 | 41 | 25 | 57 | 55 | 43 |
| 34 | 62 | 52 | 20 | 36 | 64 | 50 | 18 | 34 | 62 | 52 | 20 | 36 | 64 | 50 | 18 |
| 14 | 30 | 40 | 4  | 16 | 32 | 38 |    | 14 | 30 | 40 | 4  | 16 | 32 | 38 |    |
| 10 | 46 | 24 | 8  | 12 | 48 | 22 | 6  | 10 | 46 | 24 | 8  | 12 | 48 | 22 | 6  |
| 26 | 58 | 56 | 44 | 28 | 60 | 52 | 42 | 26 | 58 | 56 | 44 | 28 | 60 | 52 | 42 |

FIG. 44
PRIOR ART

| 24 | 8  | 12 | 48 | 22 | 6  | 10 | 46 | 24 | 8  | 12 | 48 | 22 | 6  | 10 | 46 |
|----|----|----|----|----|----|----|----|----|----|----|----|----|----|----|----|
| 56 | 44 | 28 | 60 | 54 | 42 | 26 | 58 | 56 | 44 | 28 | 60 | 54 | 42 | 26 | 58 |
| 49 | 17 | 33 | 61 | 51 | 19 | 35 | 63 | 49 | 17 | 33 | 61 | 51 | 19 | 35 | 63 |
| 37 |    | 13 | 29 | 39 |    | 15 | 31 | 37 |    | 13 | 29 | 39 |    | 15 | 31 |
| 21 | 5  | 9  | 45 | 23 | 7  | 11 | 47 | 21 | 5  | 9  | 45 | 23 | 7  | 11 | 47 |
| 53 | 41 | 25 | 57 | 55 | 43 | 27 | 59 | 53 | 41 | 25 | 57 | 55 | 43 | 27 | 59 |
| 52 | 20 | 36 | 64 | 50 | 18 | 34 | 62 | 52 | 20 | 36 | 64 | 50 | 18 | 34 | 62 |
| 40 | 4  | 16 | 32 | 38 |    | 14 | 30 | 40 | 4  | 16 | 32 | 38 |    | 14 | 30 |
| 24 | 8  | 12 | 48 | 22 | 6  | 10 | 46 | 24 | 8  | 12 | 48 | 22 | 6  | 10 | 46 |
| 56 | 44 | 28 | 60 | 54 | 42 | 26 | 58 | 56 | 44 | 28 | 60 | 54 | 42 | 26 | 58 |
| 49 | 17 | 33 | 61 | 51 | 19 | 35 | 63 | 49 | 17 | 33 | 61 | 51 | 19 | 35 | 63 |
| 37 |    | 13 | 29 | 39 |    | 15 | 31 | 37 |    | 13 | 29 | 39 |    | 15 | 31 |
| 21 | 5  | 9  | 45 | 23 | 7  | 11 | 47 | 21 | 5  | 9  | 45 | 23 | 7  | 11 | 47 |
| 53 | 41 | 25 | 57 | 55 | 43 | 27 | 59 | 53 | 41 | 25 | 57 | 55 | 43 | 27 | 59 |
| 52 | 20 | 36 | 64 | 50 | 18 | 34 | 62 | 52 | 20 | 36 | 64 | 50 | 18 | 34 | 62 |
| 40 | 4  | 16 | 32 | 38 |    | 14 | 30 | 40 | 4  | 16 | 32 | 38 |    | 14 | 30 |

| 10 | 46 | 24 | 8 | 12 | 48 | 22 | 6 | 10 | 46 | 24 | 8 | 12 | 48 | 22 | 6 |
|---|---|---|---|---|---|---|---|---|---|---|---|---|---|---|---|
| 26 | 58 | 56 | 44 | 28 | 60 | 54 | 42 | 26 | 58 | 56 | 44 | 28 | 60 | 54 | 42 |
| 35 | 63 | 49 | 17 | 33 | 61 | 51 | 19 | 35 | 63 | 49 | 17 | 33 | 61 | 51 | 19 |
| 15 | 31 | 37 | ■ | 13 | 29 | 39 | ■ | 15 | 31 | 37 | ■ | 13 | 29 | 39 | ■ |
| 11 | 47 | 21 | 5 | 9 | 45 | 23 | 7 | 11 | 47 | 21 | 5 | 9 | 45 | 23 | 7 |
| 27 | 59 | 53 | 41 | 25 | 57 | 55 | 43 | 27 | 59 | 53 | 41 | 25 | 57 | 55 | 43 |
| 34 | 62 | 52 | 20 | 36 | 64 | 50 | 18 | 34 | 62 | 52 | 20 | 36 | 64 | 50 | 18 |
| 14 | 30 | 40 | 4 | 16 | 32 | 38 | ■ | 14 | 30 | 40 | 4 | 16 | 32 | 38 | ■ |
| 10 | 46 | 24 | 8 | 12 | 48 | 22 | 6 | 10 | 46 | 24 | 8 | 12 | 48 | 22 | 6 |
| 26 | 58 | 56 | 44 | 28 | 60 | 54 | 42 | 26 | 58 | 56 | 44 | 28 | 60 | 54 | 42 |
| 35 | 63 | 49 | 17 | 33 | 61 | 51 | 19 | 35 | 63 | 49 | 17 | 33 | 61 | 51 | 19 |
| 15 | 31 | 37 | ■ | 13 | 29 | 39 | ■ | 15 | 31 | 37 | ■ | 13 | 29 | 39 | ■ |
| 11 | 47 | 21 | 5 | 9 | 45 | 23 | 7 | 11 | 47 | 21 | 5 | 9 | 45 | 23 | 7 |
| 27 | 59 | 53 | 41 | 25 | 57 | 55 | 43 | 27 | 59 | 53 | 41 | 25 | 57 | 55 | 43 |
| 34 | 62 | 52 | 20 | 36 | 64 | 50 | 18 | 34 | 62 | 52 | 20 | 36 | 64 | 50 | 18 |
| 14 | 30 | 40 | 4 | 16 | 32 | 38 | ■ | 14 | 30 | 40 | 4 | 16 | 32 | 38 | ■ |

FIG. 47
PRIOR ART

| 49 | 17 | 33 | 61 | 51 | 19 | 35 | 63 |
|----|----|----|----|----|----|----|----|
| 37 | 1  | 13 | 29 | 39 | 3  | 15 | 31 |
| 21 | 5  | 9  | 45 | 23 | 7  | 11 | 47 |
| 53 | 41 | 25 | 57 | 55 | 43 | 27 | 59 |
| 52 | 20 | 36 | 64 | 50 | 18 | 34 | 62 |
| 40 | 4  | 16 | 32 | 38 | 2  | 14 | 30 |
| 24 | 8  | 12 | 48 | 22 | 6  | 10 | 46 |
| 56 | 44 | 28 | 60 | 54 | 42 | 26 | 58 |

FIG. 48
PRIOR ART

| 35 | 63 | 49 | 17 | 33 | 61 | 51 | 19 |
|----|----|----|----|----|----|----|----|
| 15 | 31 | 37 | 1  | 13 | 29 | 39 | 3  |
| 11 | 47 | 21 | 5  | 9  | 45 | 23 | 7  |
| 27 | 59 | 53 | 41 | 25 | 57 | 55 | 43 |
| 34 | 62 | 52 | 20 | 36 | 64 | 50 | 18 |
| 14 | 30 | 40 | 4  | 16 | 32 | 38 | 2  |
| 10 | 46 | 24 | 8  | 12 | 48 | 22 | 6  |
| 26 | 58 | 56 | 44 | 28 | 60 | 54 | 42 |

FIG. 49
PRIOR ART

| 24 | 8  | 12 | 48 | 22 | 6  | 10 | 46 |
|----|----|----|----|----|----|----|----|
| 56 | 44 | 28 | 60 | 54 | 42 | 26 | 58 |
| 49 | 17 | 33 | 61 | 51 | 19 | 35 | 63 |
| 37 | 1  | 13 | 29 | 39 | 3  | 15 | 31 |
| 21 | 5  | 9  | 45 | 23 | 7  | 11 | 47 |
| 53 | 41 | 25 | 57 | 55 | 43 | 27 | 59 |
| 52 | 20 | 36 | 64 | 50 | 18 | 34 | 62 |
| 40 | 4  | 16 | 32 | 38 | 2  | 14 | 30 |

FIG. 50
PRIOR ART

| 10 | 46 | 24 | 8  | 12 | 48 | 22 | 6  |
|----|----|----|----|----|----|----|----|
| 26 | 58 | 56 | 44 | 28 | 60 | 54 | 42 |
| 35 | 63 | 49 | 17 | 33 | 61 | 51 | 19 |
| 15 | 31 | 37 | 1  | 13 | 29 | 39 | 3  |
| 11 | 47 | 21 | 5  | 9  | 45 | 23 | 7  |
| 27 | 59 | 53 | 41 | 25 | 57 | 55 | 43 |
| 34 | 62 | 52 | 20 | 36 | 64 | 50 | 18 |
| 14 | 30 | 40 | 4  | 16 | 32 | 38 | 2  |

DIGITAL IMAGE PROCESSING METHOD SUITABLE FOR HALFTONE REPRESENTATION BASED ON DITHER PROCESS

This is a continuation of U.S. patent application Ser. No. 08/101,719, filed Aug. 4, 1993, now abandoned.

BACKGROUND OF THE INVENTION

The present invention relates to a digital image processing method suitable for halftone image representation based on an improved dither method in which tone or gradation is represented by changing the ratio of recording dots to non-recording dots in a unit area, the digital image processing method producing a halftone image with a high gradation and high resolution in which one dot is represented with a plurality of tone levels.

A digital image processing apparatus is designed to process image data in a digital form. For example, it is known that digital image data can be represented by the dot matrix method. In the dot matrix method, each dot is represented by only a few tone (gradation) levels. However, in order to record a high-quality image relating to photographs or pictures on a recording medium such as paper, a dot should be represented by a plurality of tone levels for each of the basic colors such as yellow (Y), magenta (M), cyan (C) and black (Bk).

In order to enable the above mentioned multilevel image representation, it has been proposed that a dot area, which has a fixed area and is composed of a plurality of dots, be defined as a unit area for the tone production process, and the tone representation be made by changing the number of recording dots and the number of non-recording dots contained in the unit area. Examples of this type of image representation are a tone production method employing a density pattern, and a dither method.

However, the conventional multilevel image representation has a disadvantage in that as the number of tone levels increases, the resolution is deteriorated. An increase in the number of tone levels is suitable for images of photographs, but, on the other hand, it is unsuitable for character images and line images when it is desired to reproduce images with a high resolution. Therefore, it is preferable to represent character and line images by using a bi-level signal.

In the conventional dither method, which of various dither matrix patterns is used is based on whether the tone representation or the resolution should be mainly considered. When great importance is attached to the number of tone levels (tone representation), a dot concentration pattern is used. On the other hand, when great importance is attached to the resolution, a dot scattering pattern is used.

An improved image processing method based on the above mentioned dither method has been proposed in order to provide an image processing method for increasing both the gradation and the resolution of an output image (see Japanese Patent Publication "Kokoku" Nos. 64-1992 and 1-31753). In the improved image processing method, the tone representation is made by changing the ratio of recording dots to non-recording dots contained in a unit area. However, the improved image processing method has a disadvantage in that although the line density of an output image is increased to give the image a higher resolution, the gradation thereof is deteriorated.

Due to recent developments in image processing technology of a laser printer, a tone representation of each pixel of an image made by an increased number of tone levels (e.g. 256 levels) has been realized. An improved image processing based on the recent laser printer technology mentioned above has been proposed. In order to represent a dot by a plurality of tone levels, in the improved image processing, the laser pulse width which is proportional to the amount of electrostatic charge on a photosensitive medium for printing a dot is modulated in accordance with image data relating to the dot (see Japanese Patent Publication "Kokoku" No. 3-59622). However, the proposed method mentioned above has a disadvantage in that although the resolution is increased by increasing the line density of the output image, the gradation thereof is deteriorated.

In a conventional image forming process, the tone representation relating to one dot which is made by an increased number of tone levels is somewhat unstable when a gradation characteristic varies. For example, FIGS. 4A and 4B show two gradation characteristics indicating the relationship between the input image level and the output image gradation. The gradation characteristic may vary depending on the temperature and humidity. A printed image based on the gradation characteristic shown in FIG. 4A is different from a printed image based on the gradation characteristic shown in FIG. 4B.

In addition, in a conventional image forming process, the quality of the output image is determined depending on the size of a dot being formed. For example, when a dot having a relatively large size is formed, a relatively large amount of toner is used to record the dot, so that the recorded dot will be clear and have a regular shape. When a dot having a relatively small size is formed, only a small amount of toner is used to record the dot, so that the recorded dot will be faded or have an irregular shape.

In addition, in a conventional printing technology, the screen angle of a dot image (mesh pattern) for each of the basic colors is changed by selecting one of various dither matrix patterns in the dither processing prior to the printing of an output image. In order to use various dither matrix patterns in the dither processing for the basic colors, it is necessary to store all the dither matrix patterns in a storage memory, thereby making the capacity needed for the memory to store the matrix patterns large.

SUMMARY OF THE INVENTION

Accordingly, it is a general object of the present invention to provide an improved image processing method in which the above described problems are eliminated.

Another, more specific object of the present invention is to provide a digital image processing method capable of producing a high-quality halftone image having a high gradation and high resolution in which one dot is represented by a plurality of tone levels.

Still another object of the present invention is to provide a digital image processing apparatus in which the capacity of a dither matrix memory needed for storing a dither matrix pattern is reduced.

The above mentioned objects of the present invention can be achieved by a digital image processing method which includes first through fifth steps. The first step is providing a first matrix pattern having a plurality of threshold values stored in a storage memory. The second step is defining a size of each of second matrix patterns based on a predetermined area of the first matrix pattern. The first matrix pattern is composed of the second matrix patterns each of which includes a partial set of the threshold values and has the defined size so that a line density of an output image is determined. The third step is reading two or more threshold values of one of a plurality of basic matrix patterns from the storage memory at specified addresses. Each second matrix pattern is composed of the basic matrix patterns each of which has two or more threshold values and corresponds to one pixel. The fourth step is comparing the digital image data relating to one pixel with the threshold values of the basic matrix pattern to produce a multilevel image signal based on the comparison result. The fifth step is outputting the multilevel image signal relating to one dot, so that each dot is represented by a plurality of tone levels determined by each basic matrix pattern.

According to the present invention, it is possible to efficiently produce a high-quality halftone image having a high gradation and high resolution, and it is possible to represent each dot of the halftone image by a plurality of tone levels. In addition, it is possible to remarkably reduce the capacity of the dither matrix memory of the digital image processing apparatus needed for storing the dither matrix pattern.

BRIEF DESCRIPTION OF THE DRAWINGS

Other objects, features and advantages of the present invention will become apparent from the following detailed description when read in conjunction with the accompanying drawings in which:

FIG. 3 is a diagram showing a multi-structure dither matrix pattern of 24×8 elements used by the first embodiment of the present invention;

FIGS. 5 and 6 are diagrams showing examples of dot images respectively produced by using a dot concentration pattern and a dot scattering pattern;

FIG. 12 is a diagram showing an example of a dot image produced by using the dither matrix pattern shown in FIG. 9A;

FIGS. 33 through 36 are diagrams showing dither matrix patterns for black, cyan, magenta and yellow used by the third embodiment;

FIGS. 37 through 40 are diagrams respectively showing examples of black, cyan, magenta and yellow dot images when an input image data with a low density is processed by using the dither matrix patterns in FIGS. 33–36;

FIG. 41 is a diagram showing a color image which is produced by overprinting the four-color dot images shown in FIGS. 37–40;

FIGS. 42 through 45 are diagrams showing examples of black, cyan, magenta and yellow dot images when an input image data with a low density is processed by using conventional dither matrix patterns;

FIG. 46 is a diagram showing a color image which is produced by overprinting the four-color dot images shown in FIGS. 42–45;

FIGS. 47 through 50 are diagrams respectively showing the conventional dither matrix patterns for black, cyan, magenta and yellow;

DESCRIPTION OF THE PREFERRED EMBODIMENTS

Figure 1:
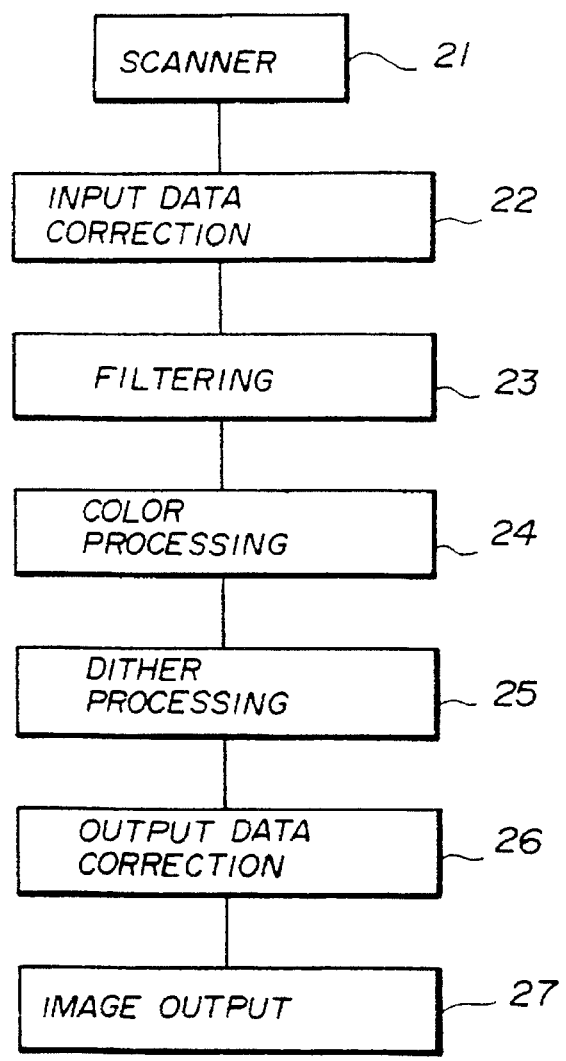
FIG. 1 is a block diagram showing an electrophotographic printing system to which the present invention is applied.

A description will now be given, with reference to FIG. 1, of an image processing system to which the present invention is applied. FIG. 1 shows an electrophotographic printing system to which the present invention is applied.

As shown in FIG. 1, the electrophotographic printing system has an image reading section or scanner 21 which includes optics, CCD line sensor and video amplifier and reads a document image by decomposing it into three separated color signals R, G, B. An input data correcting section 22 subjects the separated color signals, output by the image reading 21, to a gamma correction process, so that the input data correcting section 22 outputs corrected color signals R, G, B which are not dependent on the characteristics of the scanner 21.

A filtering section 23 selectively performs a smoothing process of color signals R, G, B of picture areas of the document image to prevent the occurrence of moire, and performs an edge emphasizing process of color signals R, G, B of character areas of the document image.

A color processing section 24 receives input digital image data of red (R), green (G) and blue (B) from the filtering section 23, and outputs image data relating to yellow (Y), magenta (M) and cyan (C). The color processing section 24 includes another color processing part which outputs image data relating to black (Bk). The image signals output by the color processing section 24 indicate the quantity of ink or toner for each of the colors of yellow, magenta, cyan and black. A dither processing section 25 subjects the color signals relating to yellow, magenta and cyan to a binarization process by using a dither matrix pattern. The dither processing section 25 includes a dither matrix memory for storing various dither matrix patterns such as a dot concentration pattern, a dot scattering pattern, and a binarization pattern.

An output data correcting section 26 subjects the image data relating to yellow, magenta, cyan and black, output by the dither processing section 25, to a gamma correction process, so that the output data correcting section 26 generates output image data relating to Y, M, C and Bk which are dependent on the characteristics of the output section. An image output section 27 is made up of a laser beam printer. A color output image is produced by the image output section 27 in accordance with the image data output from the output data correcting section 26 (the electrophotographic process).

Next, a description will be given of some preferred embodiments of the image processing method and apparatus according to the present invention with reference to the accompanying drawings.

In order to record a multilevel color image on a recording medium such as paper, a dot should be represented with a number of different tone levels for each of the basic colors such as yellow (Y), magenta (M), cyan (C), and black (Bk). It is very different to record a continuous-tone image on a recording medium by changing the quantity of ink or toner used for the recording. Thus, the tone representation relating to such an image is made by changing the number of recording dots and the number of non-recording dots contained in a unit area.

In the multilevel tone representation according to the present invention, a dot image (the mesh pattern) which has a fixed area and is composed of a plurality of dots, is defined to be a unit area for the tone representation. The multilevel tone representation is made by changing the ratio of recording dots to non-recording dots in the unit area. When the dot image having a fixed area is composed of n×n dots, the total number of tone levels that can be produced by the tone production method amount to (n×n+1).

A continuous-tone image is obtained from images of photographs or the like and is represented with image data having a continuously-changing density. Image data obtained after a continuous-tone image is processed in digital form is indicated by the value of a real number relating to each pixel. A gradation image or a multilevel image is represented with a multilevel gradation and the gradation level of each pixel of such an image is indicated by the value of an integer relating to the pixel.

A bi-level image is represented with bi-level image signals indicating the value of one or zero. A halftone image can be regarded as a kind of a bi-level image, and it has been processed by using the multilevel image representation based on the dither method. The multilevel image representation is basically made by changing the ratio of recording dots to non-recording dots in a unit area of the output image, so that a kind of a bi-level image is generated. Thus, the halftone image is indicated by bi-level image signals.

It is possible to record a color image on a recording medium by overprinting a bi-level image in accordance with a digital image signal for each of the basic colors.

The above described multilevel image representation based on the dither method will be described. Herein, [G] denotes image data of an input image composed of N×N dots, and g(x, y) denotes any of the x, y components of the image data [G]. [M] denotes data of a dither matrix pattern composed of N×N threshold values, and m(x, y) denotes any of the x, y components of the dither matrix data [M]. [B] denotes image data of a bi-level image which is produced by using the multilevel image representation based on the dither method. This bi-level image is composed of N×N dots, and b(x, y) denotes any of the x, y components of the bi-level image data [B].

In the following, the operation ">:" relating to the multilevel image representation is defined as follows:

[B]=[G]>: [M]

b (x, y)=0 if g(x, y)<m(x, y)

b(x, y)=1 else.

Assuming that [[G]] denotes a multiple of the image data [G],

[[B]]=[[G]]>: [[M]]=[G]>: [M]]

[[G]]; the entire input image is made up of a plurality of image data [G] each composed of N×N dots. In other words, digital input image data is divided into a plurality of blocks [G], each block defining an area of a predetermined size of N×N dots.

[[M]]; A plurality of dither matrix data [M] are combined to form a dither matrix data [[M]] whose size is equal to the size of the input image data [[G]]. Each dither matrix data [M] has the same as the image data block [G].

[[B]]: The result of binarization by using the multilevel image representation is indicated by [[B]]. The bi-level image data [[B]] is made up of a plurality of bi-level image data [B] (each composed of N×N dots). The number of the bi-level image data [B] included in the image data [[B]] is the same as the number of the dither matrix data [M].

Therefore, the multilevel image representation relating to the entire input image data can be achieved by making the multilevel image representation relating to each of unit areas (N×N dots) included in the entire input image data. The multilevel image representation relating to one unit area can be made by considering only the [B], [G], [M] mentioned above.

FIG. 5 shows an example of a dot image (a mesh pattern) produced by using a dot concentration pattern which is composed of 8×8 elements. FIG. 6 shows an example of a dot image produced by using a dot scattering pattern which is composed of 8×8 elements. As shown in each of FIGS. 5 and 6, each dot image is produced in accordance with input image data, and the produced dot pattern or the output image contains black dots at locations where the input image data is equal to or greater than the threshold value that falls within a range between "1" and "8".

Figure 12:
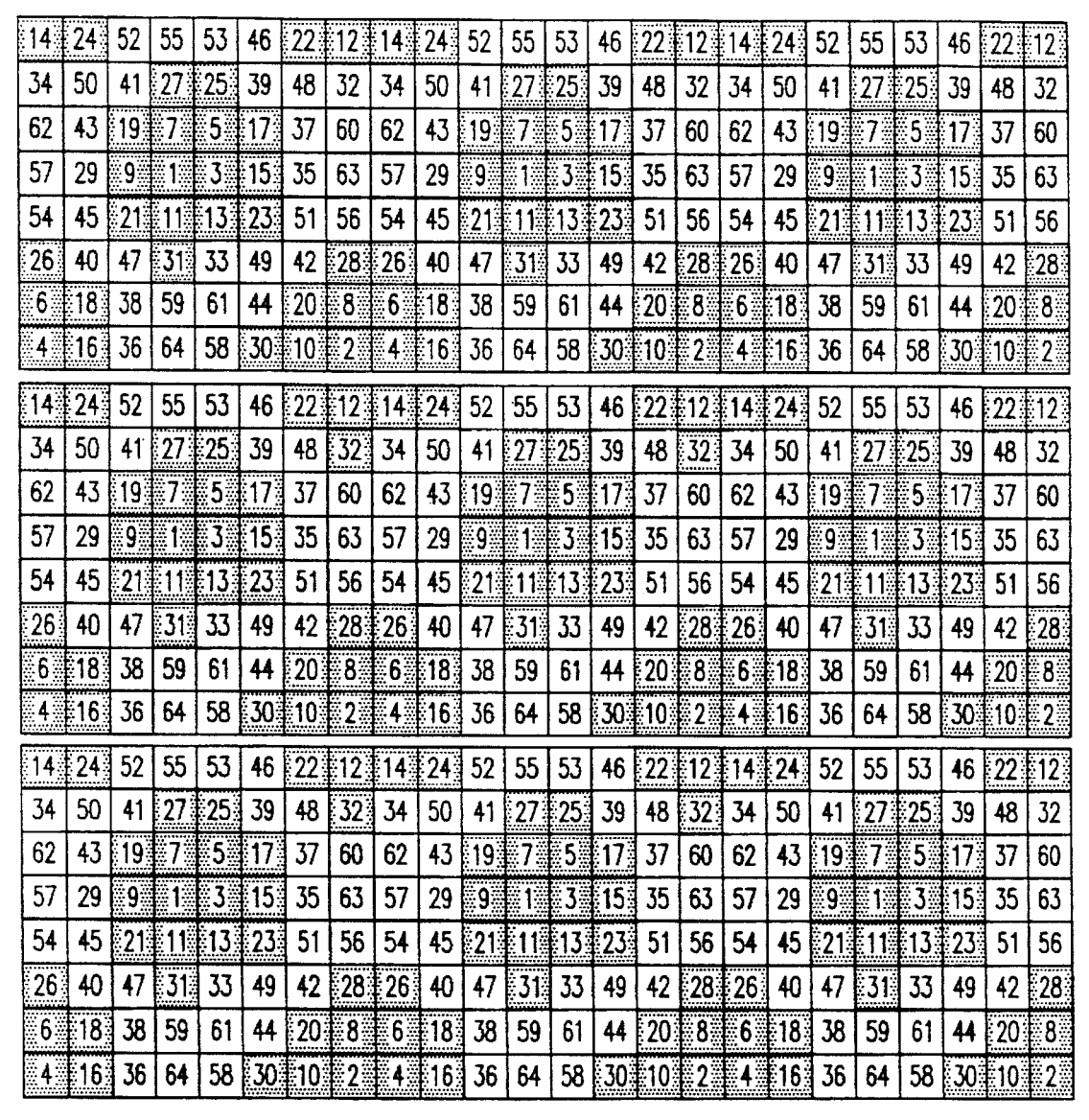

Hereinafter, a screen angle is defined to be the tangential angle relating to two adjacent dots of an output dot image. FIG. 12 shows an example of a dot image having the screen angle of 45 degrees. The number of dots in unit length of an output dot image is called a line density, and the line density is indicated in LPI (lines per inch). The resolution is defined by the line density. A dot density of an image is indicated in DPI (dots per inch).

FIG. 3 shows a multi-structure dither matrix pattern used by a first embodiment of the present invention. A parent dither matrix pattern 1 indicated in FIG. 3 contains 24×8 matrix elements each of which is a predetermined threshold value. In addition, the parent dither matrix pattern 1 is composed of sixteen (=4×4) middle matrix patterns 2 indicated by the shading in FIG. 7, and each middle matrix pattern 2 contains 6×2 threshold values from among 192 matrix elements of the pattern 1. In addition, each middle matrix pattern 2 is composed of four (=2×2) basic matrix patterns 3 indicated by a double line in FIG. 7, and each basic matrix pattern 3 contains 3×1 threshold values from among 12 matrix elements of the middle matrix pattern 2. Obviously, three threshold values of each basic matrix pattern 3 are part of the 192 matrix elements of the parent dither matrix pattern 1.

In the digital image processing according to the present invention, the basic matrix patterns 3 are used to determine the number of tone levels relating to one pixel. On the other hand, the parent dither matrix pattern 1 is used to determine the number of tone levels relating to the entire output image. When the parent dither matrix pattern 1 shown in FIG. 3 is used, the output image is represented with 192 tone levels. The middle matrix patterns 2 are used to determine the resolution.

It is known that the resolution is determined depending on the size of dither matrix used for the dither processing. For example, when a 4×4 dot concentration pattern is used, the resolution of the resulting image is determined by the size of the dot concentration pattern. In this example, digital image data of an image is divided into a plurality of blocks, each block having a size of 4×4 dots, and the image data is compared with the threshold value of the pattern. The tone representation ranging from a white level to a black level is made for each of the plurality of blocks. Therefore, the resolution is determined by the size (4×4) of the dither matrix used. When an 8×8 dot concentration pattern as shown in FIG. 5 is used, the digital image data is divided into a plurality of blocks, each block having a size of 8×8 dots, and the tone representation is made for each block. The resolution of the latter example (as shown in FIG. 5) is determined by the size (8×8) of the dither matrix used, and it is half of the resolution of the former example (the size of 4×4 dots).

On the other hand, when a 8×8 dither matrix pattern composed of four 4×4 dot scattering patterns (as shown in FIG. 6) is used, the resolution of the resulting image is determined by the size (4×4) of the dot scattering pattern, as shown in FIG. 6. When a 8×8 dither matrix pattern composed of sixteen 2×2 dot scattering patterns is used, the resolution of the resulting image is the same as the resolution determined when a 2×2 dither matrix pattern is used.

In the first embodiment of the present invention, the multi-structure dither matrix pattern shown in FIG. 3 is used for the dither processing. The basic matrix patterns 3 used to represent one pixel with a number of tone levels, and the middle matrix patterns 2 used to determine the resolution of the resulting image are incorporated in the parent dither matrix pattern 1 shown in FIG. 3. It is possible for the present invention to increase the resolution of the resulting image while the number of tone levels relating to one pixel is increased to a suitable gradation level by making use of the multi-structure dither matrix pattern in FIG. 3.

The parent dither matrix pattern 1 (24×8 elements) shown in FIG. 3 is composed of 8×8 basic matrix patterns (3×1 elements) used to represent one pixel with a number of tone levels. It should be noted that the structure of the matrix pattern shown in FIG. 1 is the essentially the same as the structure of a conventional dither matrix pattern. For example, a conventional dither matrix pattern is composed of 8×8 threshold values, and each threshold value is used to represent one pixel with a bi-level image signal.

Figure 2:
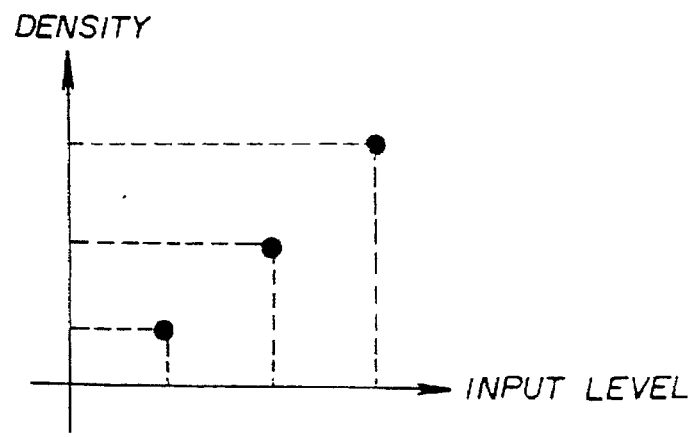
FIG. 2 is a chart showing the density characteristics relating to one dot used by a first embodiment of the present invention.
Figure 4A:
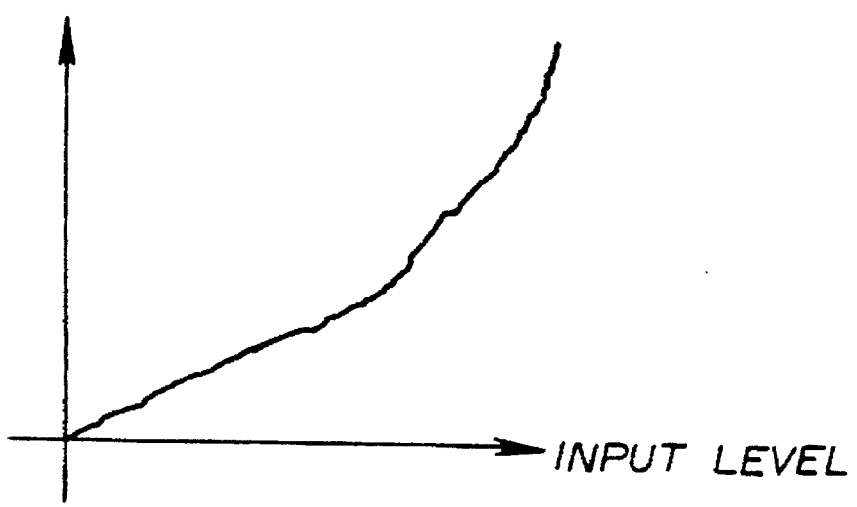
FIGS. 4A and 4B are charts showing two different gradation characteristics.
Figure 4B:
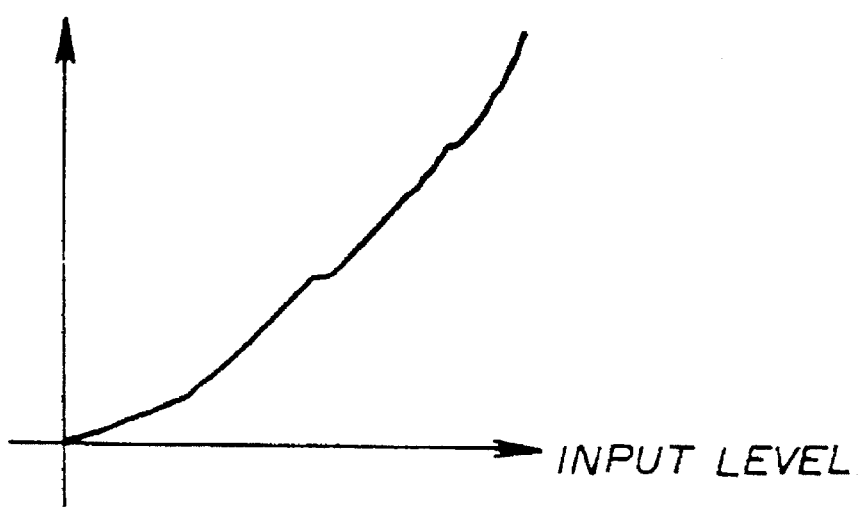

However, in the digital image processing method according to the present invention, the input image data relating to one pixel is compared with three threshold values arranged in each basic matrix pattern 3. In other words, one dot of the output image is represented with four tone levels. The basic matrix patterns 3 are used to determine the number of tone levels relating to one pixel. Therefore, when the multi-structure dither matrix pattern in FIG. 3 is used for the gradation process, every dot of an output image is represented with four tone levels, and the density of one pixel is indicated by a 2-bit image signal. FIG. 2 shows the density characteristics relating to one dot when the dither matrix pattern shown in FIG. 3 is used.

In the multi-structure dither matrix pattern shown in FIG. 3, each middle matrix pattern 2 contains 6×2 threshold values. If the parent dither matrix pattern 1 is regarded as the 8×8 matrix formation, each middle matrix pattern 2 is regarded as the 2×2 matrix formation. For example, when the first embodiment is applied to a 400-DPI printing system with the multi-structure dither matrix pattern in FIG. 3 used, the resolution of an output image is the same as the resolution of an output image produced when a 2×2 dither matrix pattern is used (the output image of the 2×2 matrix pattern has the line density of 200 lines per inch). As the parent dither matrix pattern 1 contains 24×8 threshold values, the output image produced from the input image is represented with 192 tone levels. Thus, it is possible for the present invention to produce a halftone image having a high resolution and high gradation.

The digital image processing method of the present invention using the multi-structure dither matrix pattern is advantageous over a conventional method in which one pixel is represented with 256 tone levels. When the conventional method is applied to a 400-DPI printing system, image data (monochrome) produced from an A4-size document image amounts to 16 Megabytes as one pixel is indicated by a 8-bit image signal. On the other hand, when the present invention is applied thereto by using the multi-structure dither matrix pattern in FIG. 3, image data (monochrome) produced from an A4-size document image amounts only to 4 Megabytes as one pixel is indicated by a 2-bit image signal, and the amount of the processed image data is remarkably reduced.

Figure 7:
FIG. 7 is a diagram showing a multi-structure dither matrix pattern of 8×8 elements used by a second embodiment of the present invention.
Figure 7:
Figure 7:
Figure 7:

Next, a description will be given of a second embodiment of the digital image processing method according to the present invention. FIG. 7 shows a multi-structure dither matrix pattern used by the second embodiment of the present invention. The following description will be given of a multi-structure dither matrix pattern of a relatively small matrix size, for the sake of convenience.

A parent dither matrix pattern 1 indicated by a thick line in FIG. 7 is composed of 8×8 matrix elements, and each matrix element is a specific threshold value. On the other hand, the parent dither matrix pattern 1 is composed of four middle matrix patterns 2 indicated by a dotted line in FIG. 7, and each middle matrix pattern 2 includes 4×4 matrix elements which are part of the 64 elements of the pattern 1. On the other hand, each middle matrix pattern 2 is composed of eight basic matrix patterns 3 as indicated by a double line in FIG. 7, and each basic matrix pattern 3 is composed of 1×2 matrix elements which are also the part of the 64 elements of the parent dither matrix pattern 1.

Assuming that [m(i)] (i=1 to 4) denotes any of the middle matrix patterns 2, [[mm(j)]] denotes any of the basic matrix patterns 3, and each basic matrix pattern is composed of two elements v1 and v2 indicating threshold values, $$[m(i)]=[[mm(j)]]; \ [M]=[[m(j)]]=[[[mm(j)]]],$$

$$[m(i)]=([mm(1)] \ [mm(2)] \ [mm(3)] \ [mm(4)] \ [mm(5)] \ [mm(6)] \ [mm(7)] \ [mm(8)])$$

$$[mm(j)]=(v1, v2)$$

Assuming that "g" denotes the value of image data relating to one pixel of input image, and "b" denotes the value of output image data produced after the multilevel image representation is made based on the dither processing method, $$b = \quad g >: [mm]$$
$$b = 0 \quad \text{if } g < v1$$
$$b = 1/2 \quad \text{if } v1 \leq g < v2$$
$$b = 1 \quad \text{if } g \geq v2$$

When the value "b" of output image data is equal to ½, a half-area dot having half of the area of one dot is printed. The dot area relating to one pixel can be adjusted based on the image data "b". For example, when the image data "b" is equal to ½, the area of a dot relating to the dot of interest is changed to half of the area of one dot by using the laser pulse width modulation.

In the second embodiment described above, each basic matrix pattern 3 has 1×2 threshold values from among 64 matrix elements of the parent dither matrix pattern 1. As the basic matrix pattern 3 is used to determine the number of tone levels relating to one dot, two threshold values of each basic matrix pattern correspond to one pixel of an input image. In order to subject the input image data composed of n×n dots to the gradation process for the multilevel image representation, it is necessary to combine two parent dither matrix patterns each of which contains n×n threshold values. The line density in a vertical direction of the image is doubled if the above second embodiment is applied to the input image data.

If each basic matrix pattern is composed of 2×2 elements from among 64 elements of the parent dither matrix pattern 1, the number of tone levels relating to a signal dot is equal to 5. With the modified basic matrix pattern being used, it is possible to double both the line density in vertical direction and the line density in horizontal direction.

Figure 8:
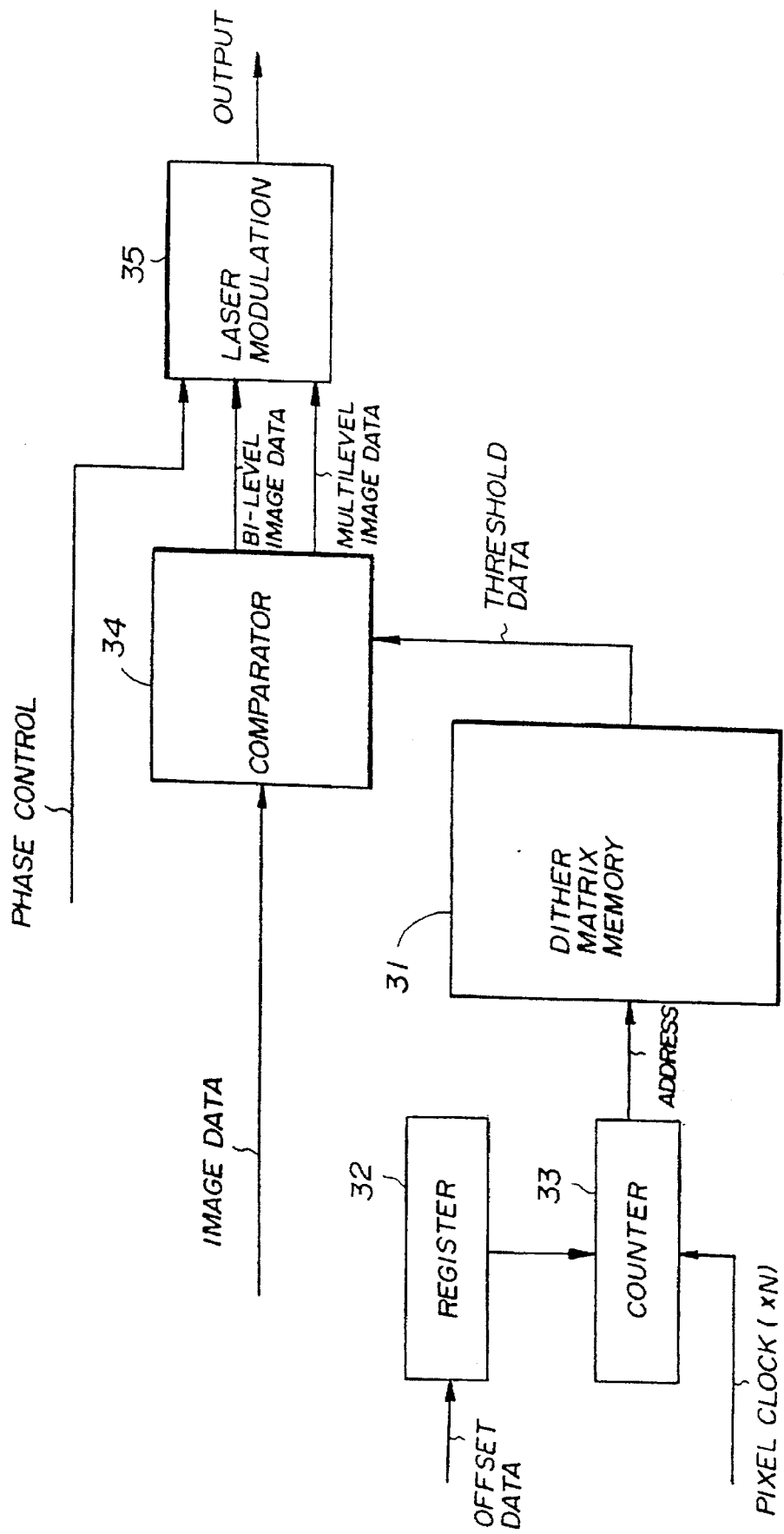
FIG. 8 is a block diagram showing a dither processing circuit of the system shown in FIG. 1 to which the present invention is applied.

FIG. 8 shows a dither processing circuit 25 of the electrophotographic printing system shown in FIG. 1. In the dither processing circuit 25 shown in FIG. 8, a dither matrix memory 31 stores a dither matrix pattern such as the multi-structure dither matrix pattern shown in FIG. 7. Threshold data of the dither matrix pattern is retrieved from the dither matrix memory 31 at a specified memory address. A register 32 receives offset data used to determine the start address at which the threshold data is read from the memory 31. A counter 33 receives the offset data supplied from the register 32, and receives a pixel clock signal (which is multiplied by N) to count the received clock pulses. By adding the offset data to the count value, the counter 33 outputs a signal indicating the start address at which the threshold data is read from the dither matrix memory 31. A comparator 34 receives image data and the threshold data from the dither matrix memory 31, so that the comparator 34 detects whether or not the image data value is smaller than the threshold value. The comparator 34 outputs a bi-level image signal or a multilevel image signal based on the result of the comparison. A laser modulation unit 35 receives a phase control signal which indicates the timing of the start of the laser light irradiation relative to the width of one dot, and it receives the multilevel image signal from the comparator 34. The laser modulation unit 35 outputs a signal used to control the laser pulse width in accordance with the multilevel image signal (or the bi-level image signal) output by the comparator 34 and in accordance with the phase control signal.

Figures 9A, 9B:
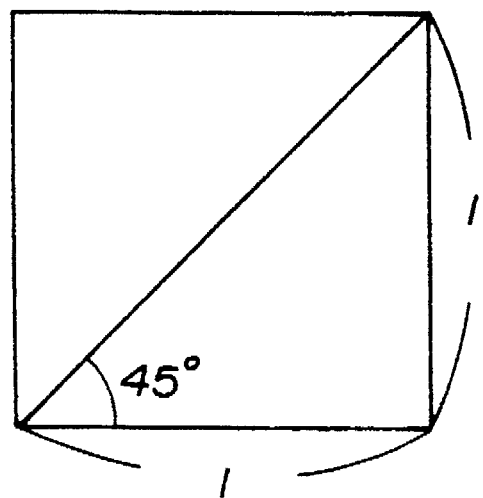
FIGS. 9A and 9B are diagrams for explaining a method of retrieving a dither matrix pattern and the resulting screen angle.
Figure 13:
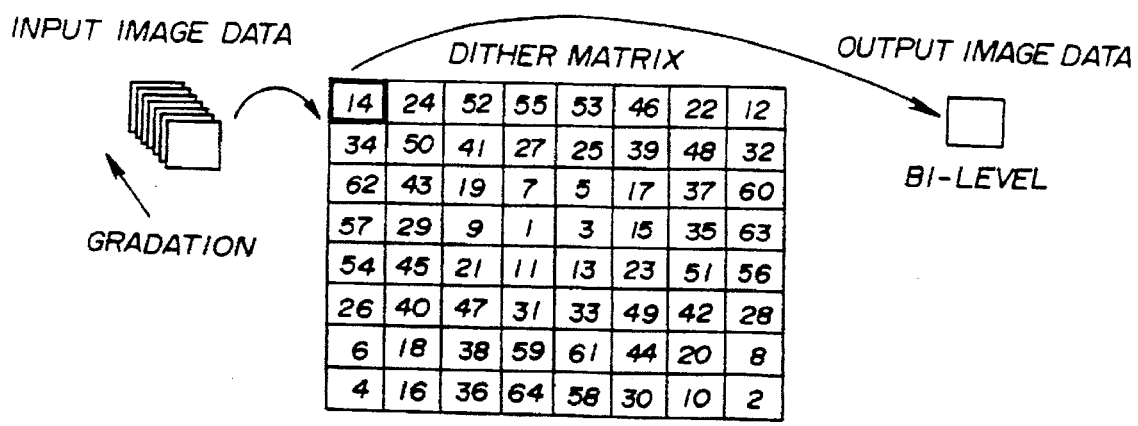
FIG. 13 is a diagram for explaining a bi-level image representation.

FIG. 9A shows a dither matrix pattern stored in the dither matrix memory 31 in FIG. 8. FIG. 13 shows the manner in which threshold data is retrieved from the memory 31 and the input image data is compared with the threshold data by using the comparator 34 as shown in FIG. 8. In the manner shown in FIG. 13, an input image signal relating to one pixel is compared with a threshold value ("14" in the pattern indicated in FIG. 13) supplied from the dither matrix memory 31, so that the comparator outputs an image signal relating to one dot. When the input image data is greater than or equal to the threshold value, an image signal indicating the value of one is output from the comparator 34. On the other hand, when the input image data is smaller than the threshold value, an image signal indicating the value of zero is output by the comparator. Thus, when the retrieval process in FIG. 13 is selected, bi-level image representation (non-enlarged or non-reduced image representation) is made.

Figures 10A, 10B:
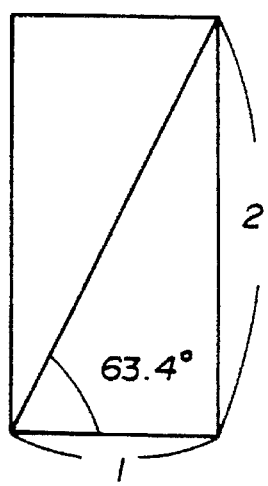
FIGS. 10A and 10B are diagrams for explaining a different method of retrieving the dither matrix pattern in FIG. 9A and the resulting screen angle.
Figures 11A, 11B:
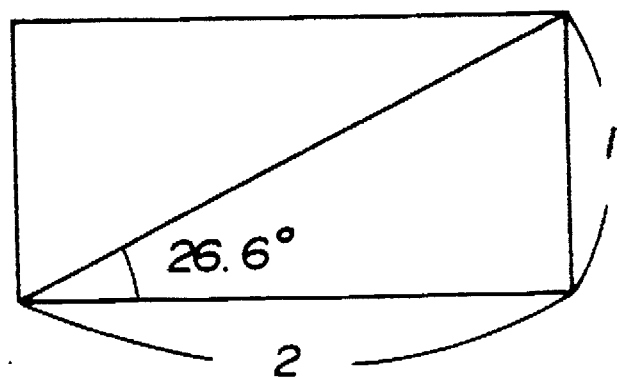
FIGS. 11A and 11B are diagrams for explaining another method of retrieving the dither matrix pattern in FIG. 9A and the resulting screen angle.

Next, the manner in which threshold data is retrieved from the dither matrix memory 31 and the input image data is compared with the threshold data according to the present invention will be described. When either of the retrieval processes shown in FIGS. 10A and 11A is selected, an input image signal relating to one pixel is compared with two or more threshold values supplied from the dither matrix memory 31, so that the comparator 34 outputs a multilevel image signal (three or more tone levels) relating to one dot. A simple method for producing multilevel image data is to count the number of occurrences of the value "1" of an output signal based on the result of the comparison with the threshold data.

FIG. 10A shows the manner of the retrieval from the dither matrix memory 31 according to the present invention. In the manner shown in FIG. 10A, the input image data relating to one pixel is compared with two threshold values from the dither matrix pattern. These values are arrayed in a horizontal direction of the dither matrix pattern in FIG. 9A. FIG. 11A shows a different manner of the retrieval from the dither matrix memory 31 according to the present invention. In the manner shown in FIG. 11A, the input image data relating to one pixel is compared with two threshold values, and these values are arrayed in a vertical direction of the dither matrix pattern in FIG. 9A.

For example, the operation of the comparator 34 when the input image data is compared with two threshold values "14" and "24" in FIG. 10A will be described. When the input image data is smaller than the threshold value "14", an image signal indicating the value of 0 is output by the comparator 34. When the input image data is greater than "14" and smaller than "24", an image signal indicating the value of ½ (=0.5) is output. When the input image data is greater than "24", an image signal indicating the value of 1 is output. Thus, when either of the two processes shown in FIGS. 10A and 11A is used, a multilevel image signal relating to a single dot is output by the comparator 34 (wherein one dot is represented with three tone levels). In the digital image processing method according to the present invention, the multilevel image representation relating to a single dot is thus achieved by using the basic matrix patterns 3 containing two or more threshold values.

In order to compare one pixel of input image data with a plurality of threshold values from the dither matrix memory 31, the pixel clock signal multiplied by N (where N is an integer greater than or equal to 2) is input to the counter 33 shown in FIG. 8. The speed at which the threshold value is supplied from the memory 31 to the comparator 34 is N times as high as the speed at which the input image data is supplied for every pixel to the comparator 34.

If an image output unit capable of outputting a halftone image in which one dot is represented with three or more tone levels is provided in the image processing apparatus, it is possible for the image processing apparatus to produce a halftone image in which the multilevel image representation for every dot is made.

As described above, FIG. 12 shows a dot image (mesh pattern) produced by using the dither matrix pattern in FIG. 9A, and the number indicated by each element of the matrix is a predetermined threshold value. In the dot image shown in FIG. 12, a dot where the input image data is greater than the threshold value from the dither matrix memory 31 is shaded or indicated as a black dot (or the recording dot), and a dot where the input image data is not greater than the threshold value is indicated as a blank dot (or the non-recording dot). As shown in FIG. 12, the black dots of the dot image are arranged in 45-degree diagonal directions, and the screen angle is equal to 45 degrees.

Generally, when two or more dot images are overlapped with a relatively small difference between the screen angles of the dot images, it is likely that the moire occurs. When two or more dot images are overlapped with a relatively great difference between the screen angles or no difference between the screen angles, it is unlikely that the moire appears. However, it is very difficult to make the screen angles of the dot images equal to each other.

Thus, in order to prevent the occurrence of moire when a color image is recorded by overprinting multilevel output images of the basic colors, it is necessary that the screen angles of the multilevel output images have a relatively great difference.

In the digital image processing method according to the present invention, a different retrieval process is selected from among a plurality of predetermined retrieval processes for retrieving threshold data from the dither matrix memory 31 for each basic color and the dither matrix pattern shown in FIG. 9A is commonly used. For example, when the retrieval process in FIG. 9A is selected, the screen angle of the dot image is equal to 45 degrees as shown in FIG. 9B. When the retrieval process in FIG. 10A is selected, the screen angle is equal to 63.4 degrees as shown in FIG. 10B. When the retrieval process shown in FIG. 11A is selected with the dither matrix pattern of FIG. 9A, the screen angle is equal to 26.6 degrees.

As described above, in the digital image processing method according to the present invention, one of a plurality of predetermined retrieval processes is selected for each of the basic colors and one dither matrix pattern stored in the dither matrix memory 31 is commonly used, so that the screen angles of the dot images for the basic colors are different from each other. Thus, it is possible for the present invention to reduce the capacity of the dither matrix memory 31 needed for storing the dither matrix pattern.

Figure 14:
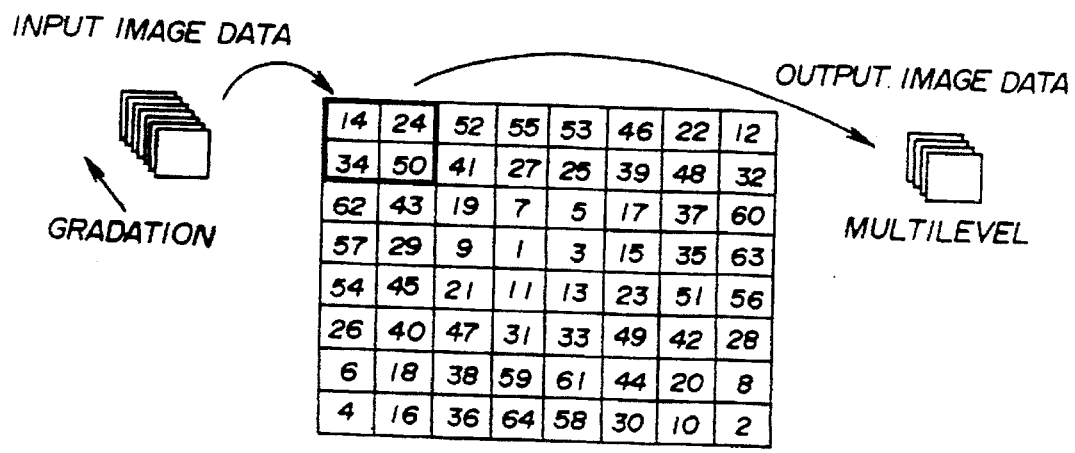
FIG. 14 is a diagram for explaining a multilevel image representation.

Next, a description will be given of the halftone image representation according to the present invention with reference to FIGS. 13 through 17. FIGS. 13 and 14 show two kinds of non-enlarged (or non-reduced) image representation which is made by using the dither matrix pattern in FIG. 9A. As previously described, when the retrieval process in FIG. 13 is selected, an input image signal relating to one pixel is compared with a threshold value from the dither matrix memory 31, so that the comparator 34 outputs a bi-level image signal relating to one dot based on the result of the comparison.

When the retrieval process shown in FIG. 14 is selected, an input image signal relating to one pixel is repeatedly compared with 2×2 threshold values supplied from the dither matrix memory 31, so that the comparator 34 outputs a multilevel image signal relating to one dot.

Figure 15:
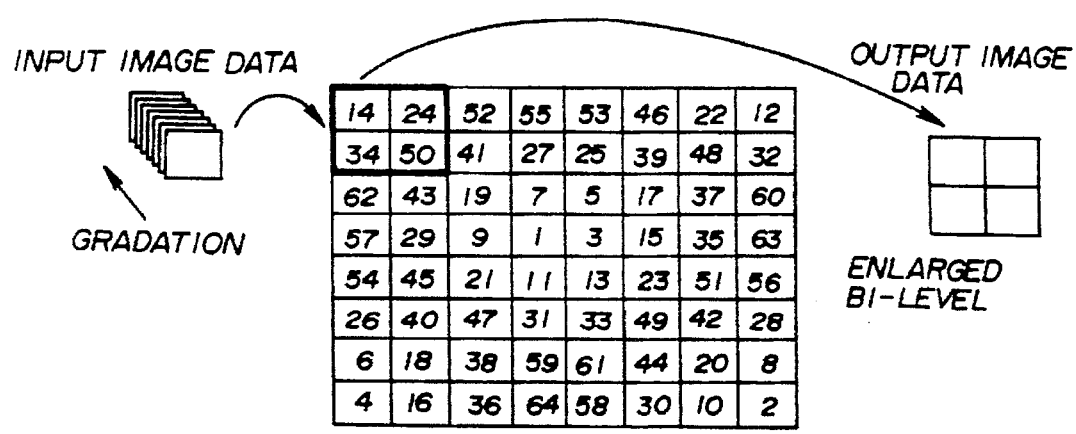
FIG. 15 is a diagram for explaining an enlarged bi-level image representation.
Figure 16:
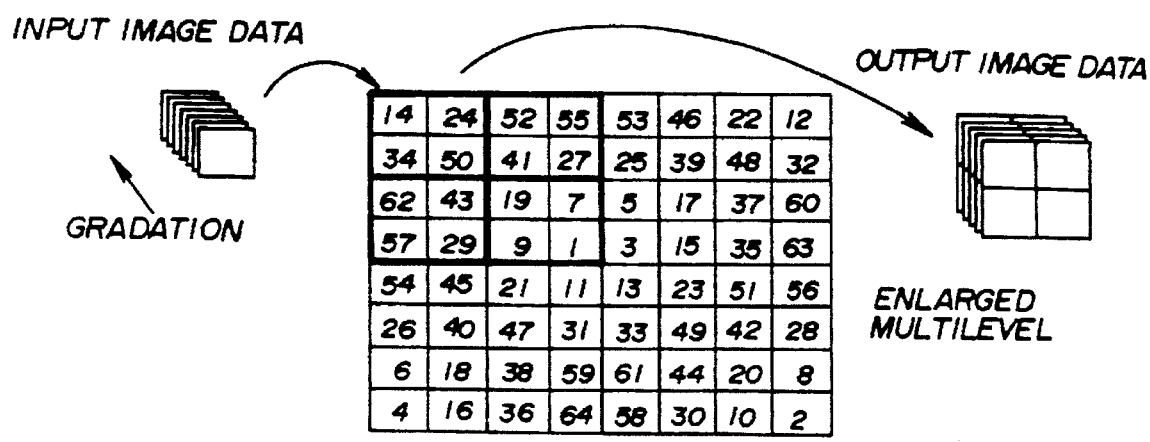
FIG. 16 is a diagram for explaining an enlarged multilevel image representation.

FIGS. 15 and 16 shows two kinds of enlarged image representation which is made by using the dither matrix pattern in FIG. 9A. When the retrieval process shown in FIG. 15 is selected, an input image signal relating to one pixel is repeatedly compared with 4 (=2×2) threshold values supplied from the dither matrix memory 31. Each time the input image signal is compared with one of the four threshold values, the comparator 34 outputs a bi-level image signal relating to one dot. Thus, four bi-level image signals relating to four dots are produced from one pixel of the input image, as shown in FIG. 15, so that enlarged bi-level image representation is made.

On the other hand, when the retrieval process shown in FIG. 16 is selected, an input image signal relating to one pixel is repeatedly compared with 16 (=4×4) threshold values supplied from the dither matrix memory 31. When the input image signal relating to one pixel is compared with four out of the sixteen threshold values, the comparator 34 outputs a multilevel image signal relating to one dot. Thus, four multilevel image signals relating four dots are produced from one pixel of the input image, as shown in FIG. 16, so that enlarged multilevel image representation is made.

Figure 17:
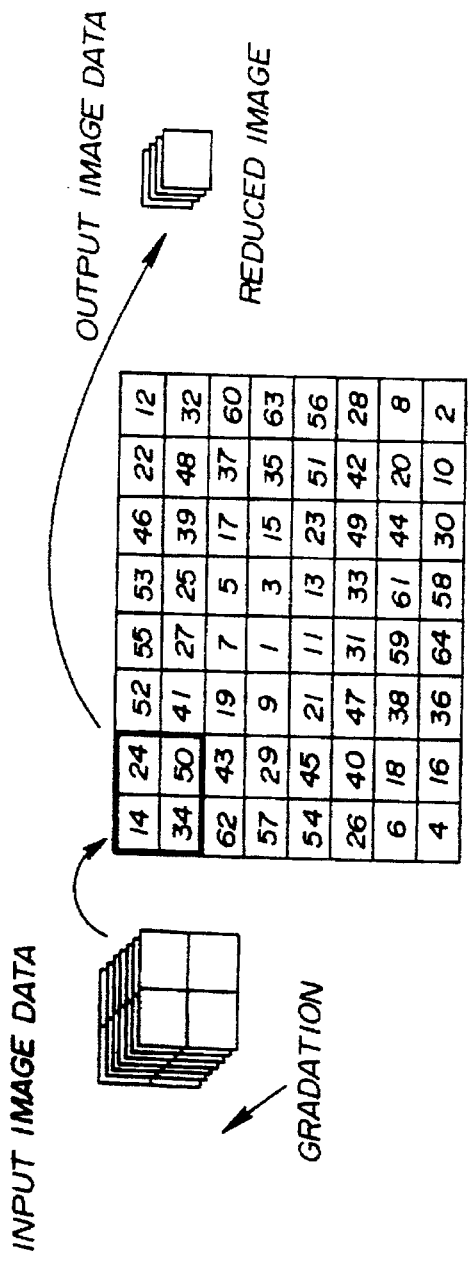
FIG. 17 is a diagram for explaining a reduced multilevel image representation.

FIG. 17 shows reduced image representation which is made by using the dither matrix pattern in FIG. 9A. When the process shown in FIG. 17 is selected, input image signals relating to four (=2×2) pixels are respectively compared with four (=2×2) threshold values supplied from the dither matrix memory 31. The number of occurrences where the input image data is greater than or equal to the threshold value based on the result of comparison is counted. The comparator 34 outputs a multilevel image signal relating to one dot which signal indicates the counted number. Thus, one multilevel image signal relating to one dot is produced from four pixels of the input image, and reduced multilevel representation is made.

Next, a description will be given of the multilevel image representation which is made based on the control signal output from the laser modulation unit 35 shown in FIG. 8.

Figure 18:
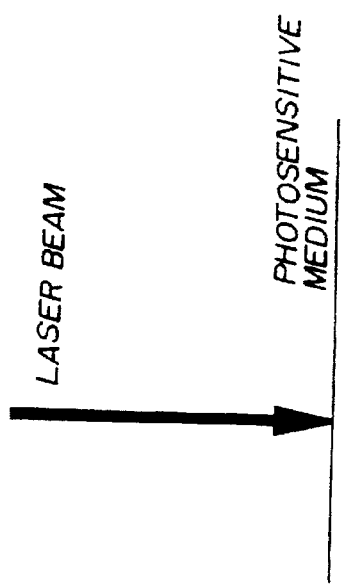
FIG. 18 is a diagram showing laser light irradiated onto a photosensitive drum of a laser printer.

As previously described, in accordance with the phase control data and the multilevel image data output from the comparator 34, the laser modulation unit 35 outputs a control signal used to control the laser pulse width modulation. The phase control signal supplied to the laser modulation unit 35 indicates the timing of the start of laser light irradiation relative to the width of one dot. Thus, the multilevel image representation relating to one dot is made by controlling the laser pulse width modulation when laser light is irradiated to a photosensitive medium so as to form one dot, as shown in FIG. 18.

Figure 19:
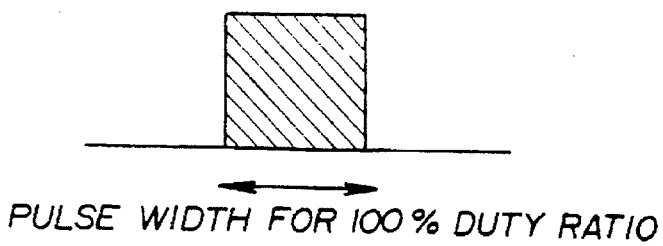
FIGS. 19 through 21 are diagrams showing various laser pulse widths relating to one dot which are made by changing a duty ratio of a control signal.
Figure 20:
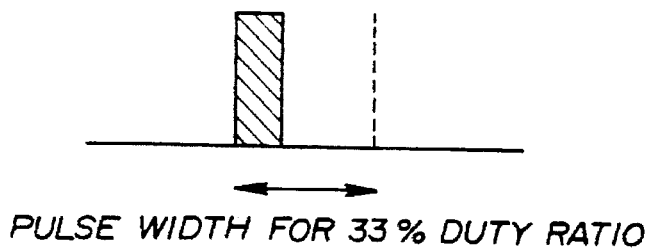
Figure 21:
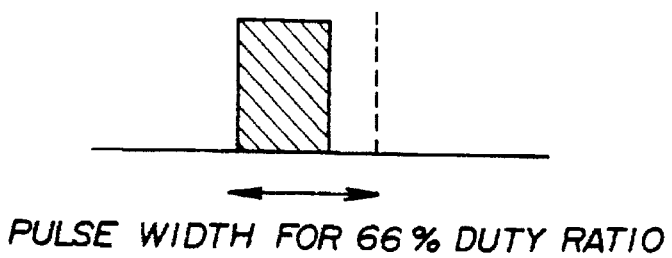

FIGS. 19 through 21 show various laser pulse widths relating to one dot which are made by changing a duty ratio of a control signal output by the laser modulation unit 35. The duty ratio of the control signal indicates the ratio of on-time of the laser light source (a laser diode) within a duty cycle to total duty-cycle time, and the total duty-cycle time corresponds to the width of a single dot. A laser pulse width relating to one dot which is made with a 100% duty ratio of the control signal is indicated in FIG. 19. A laser pulse width relating to one dot which is made with a 33% duty ratio of the control signal is indicated in FIG. 20. A laser pulse width relating to one dot which is made with a 66% duty ratio of the control signal is indicated in FIG. 21.

Figure 22:
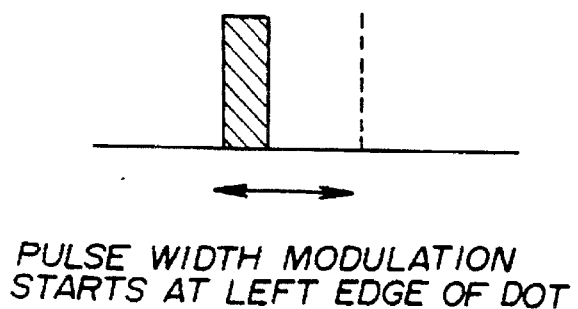
FIGS. 22 through 24 are diagrams showing various start points of the laser light irradiation relating to one dot which are controlled in accordance with a phase control signal.
Figure 23:
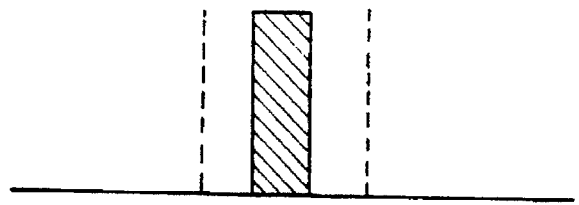
Figure 24:
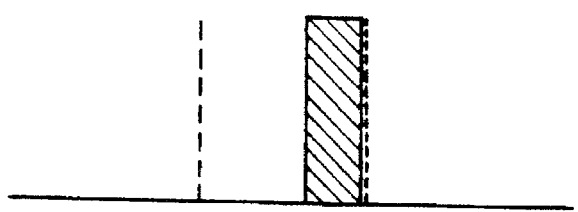

FIGS. 22 through 24 show various start points of the laser light irradiation relating to one dot which are controlled in accordance with a phase control signal. The start point of the laser light irradiation which is adjusted to the left edge of one dot is indicated in FIG. 22. The start point of the laser light irradiation which is adjusted to the center of one dot is indicated in FIG. 23. The start point of the laser light irradiation which is adjusted to the right edge of the one dot is indicated in FIG. 24.

Figure 25:
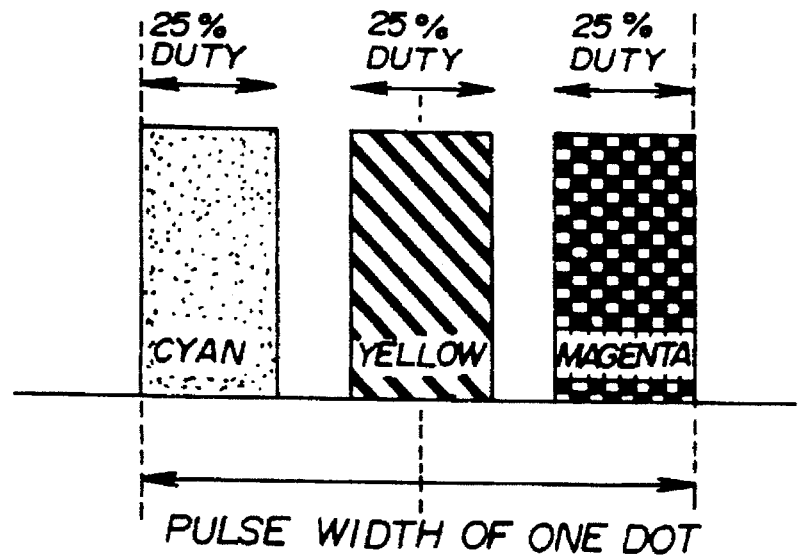
FIG. 25 is a diagram showing a start point of the laser light irradiation relating to one dot for the basic colors in which three dots of the basic colors are overprinted.

FIG. 25 shows a start point of the laser light irradiation relating to one dot for the basic colors such as cyan, yellow and magenta in which three dots for the basic colors are overprinted. The laser pulse widths for the three basic colors are made with a 25% duty ratio of the control signal, and the starting points of the light light irradiation are changed in accordance with phase control signals for the three basic colors, thereby preventing the three dots of the basic colors from overlapping within one dot. It is possible to produce a high-quality color image by using the pulse width and phase control method shown in FIG. 25.

Figure 26:
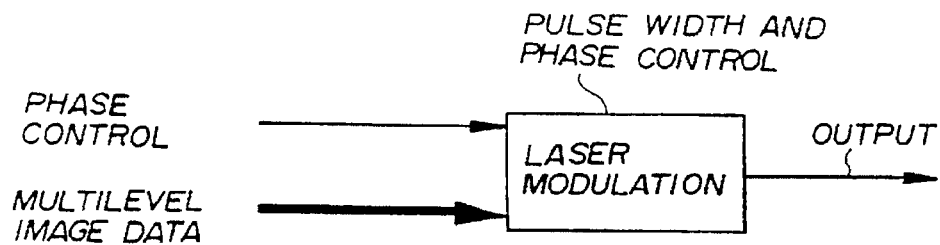
FIGS. 26 through 28 are diagrams showing various laser light modulation units according to the present invention.

FIG. 26 shows a laser light modulation unit in which the pulse widths of the basic colors relating to one dot are controlled in accordance with the multilevel image signal supplied from the comparator 34, and in which the start points of the laser light irradiation to form dots relating to the basic colors are controlled in accordance with the phase control signal. However, in the unit shown in FIG. 26, it is necessary to supply a phase control signal to the laser modulation unit 35 when one dot is printed for each of the basic colors, and a complicated processing with a large capacity of the image storage memory is required.

Figure 27:
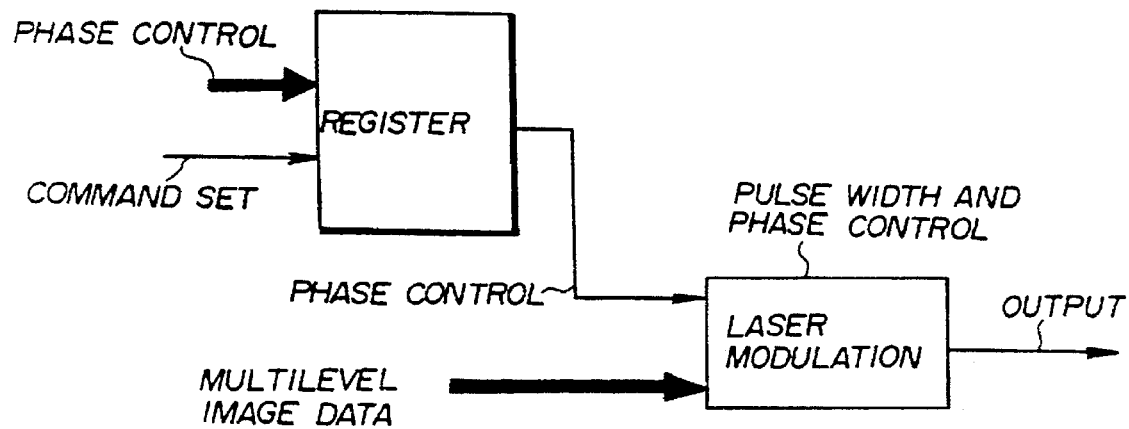

FIG. 27 shows a different laser light modulation unit according to the present invention. In the unit shown in FIG. 27, a register coupled to the laser modulation unit is provided. The register receives a command set and a phase control signal, so that the phase control data for each of the basic colors such as cyan, yellow and magenta is held before an image for each basic color is printed. The phase control data is supplied from the register to the laser modulation unit for each basic color.

Figure 28:
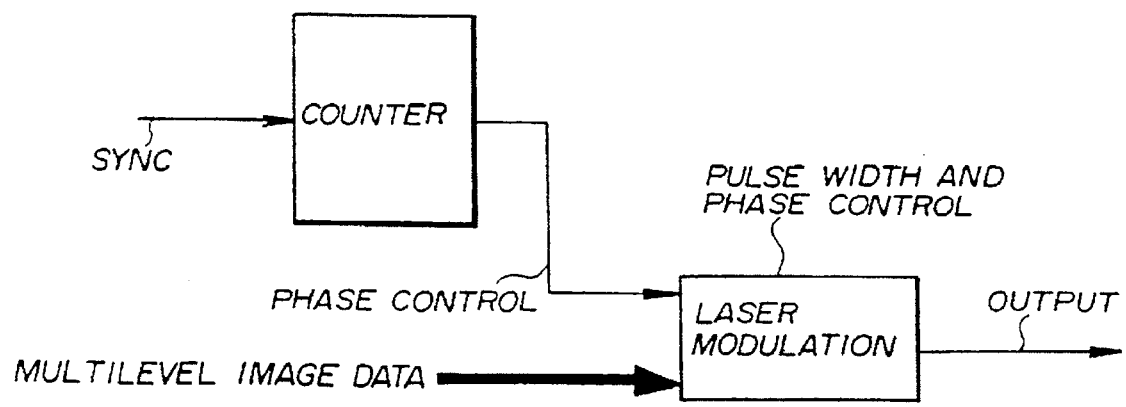

FIG. 28 shows another laser light modulation unit according to the present invention, which is applied to an electrophotographic printing system. In the printing system, an image for each basic color is printed while a photosensitive drum to which laser light is irradiated is rotated one revolution (one frame processing). In the unit shown in FIG. 28, a counter coupled to the laser modulation unit is provided, and the counter counts sync signals for each color plane which are produced while the photosensitive drum is rotated one revolution. The phase control signal is held by the counter before an image of one basic color is recorded. Color identification data (for example, "00" for cyan, "01" for yellow, and "10" for magenta) is attached to two lowest-order bits of the phase control signal. The thus produced phase control signal is supplied to the laser modulation unit for each color. The start points of the laser light irradiation are controlled in accordance with the phase control signal.

Figure 29A:
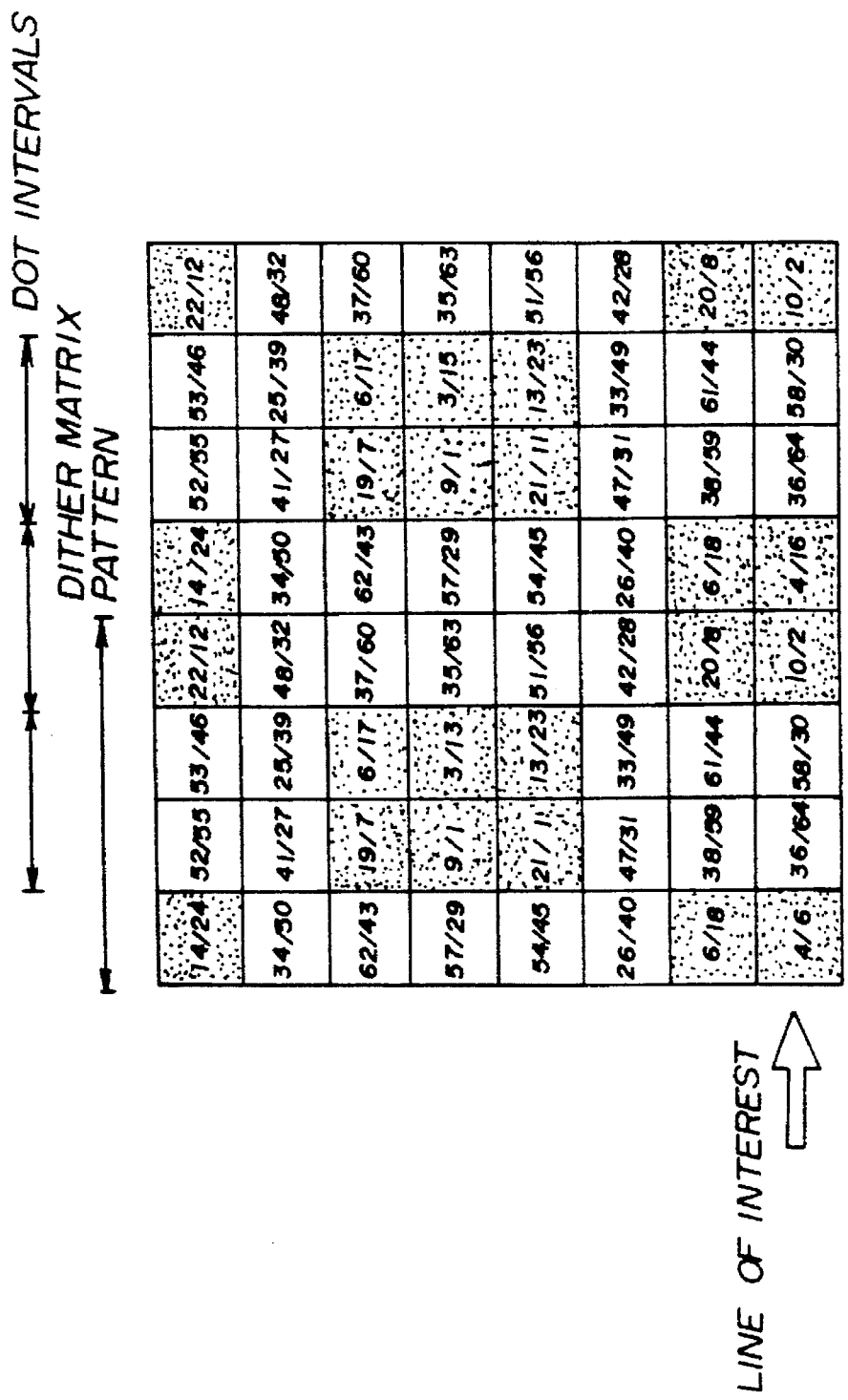
FIGS. 29A, 29B and 29C are diagrams for explaining a method of laser light modulation according to the present invention.

FIG. 29A shows an example of a dot image which is produced by using the process shown in in FIG. 10A. In the dot area in FIG. 29A, the input image data relating to one pixel is compared with two threshold values arrayed in the dither matrix pattern, and one dot is represented with three tone levels. The three tone levels of the output image are indicated by the values "0", "0.5" and "1". A dot with the tone level "0.5" is represented with a 50% duty ratio of the control signal output from the laser light modulation unit.

Figure 29B:
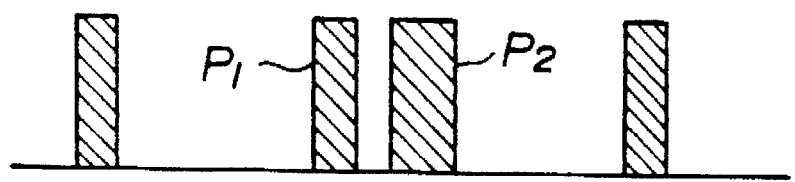

FIG. 29B shows laser pulse signals output by the laser light modulation when dots of the dot image arrayed on the line of interest indicated by the arrow in FIG. 29A are recorded. As the start point of laser light irradiation relating to each dot is fixed to the left edge of the dot, a pulse signal P1 (50% duty ratio) and a pulse signal P2 (100% duty ratio) split to form two separate dots as in FIG. 29B.

Figure 29C:
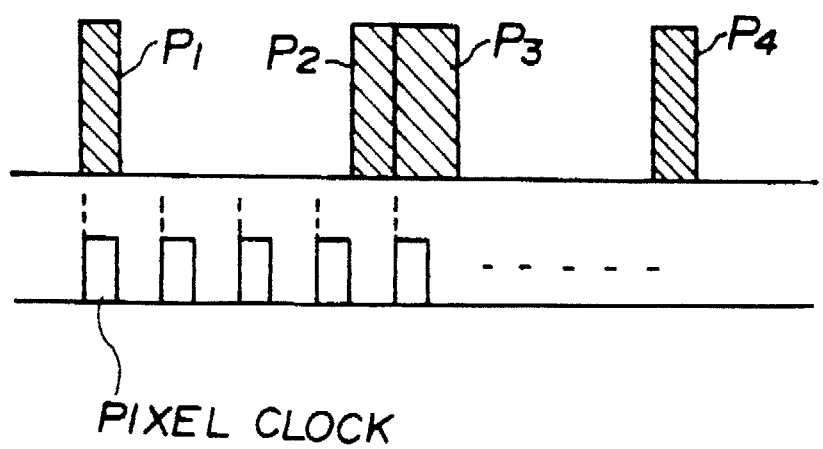

FIG. 29C shows a modification of laser pulse signals output from the laser light modulation according to the present invention when dots of the dot image arrayed on the line of interest indicated by the arrow in FIG. 29A are recorded. In the example shown in FIG. 29C, the start point of laser light irradiation within one dot is adjusted in accordance with the interval of recording dots in the dot image. Accordingly, a pulse signal P2 and a pulse signal P3 are united into one dot as in FIG. 29C. As for a pulse signal P1 (50% duty ratio), the start point of laser light irradiation is changed to the left edge of one dot. As for a pulse signal P2 (50% duty ratio), the start point of laser light irradiation is changed to the right edge of one dot. As for a pulse signal P3 (100% duty ratio), the start point of laser light irradiation is changed to the left edge of one dot. As for a pulse signal P4 (50% duty ratio), the start point of laser light irradiation is changed to the right edge of one dot.

When the pulse signals shown in FIG. 29B are used, it is difficult to record stable, regular dots during an image forming process of a laser printer. On the other hand, when the pulse signals shown in FIG. 29C are used, it is possible to produce a high-quality image with stable, regular dots.

Figure 30:
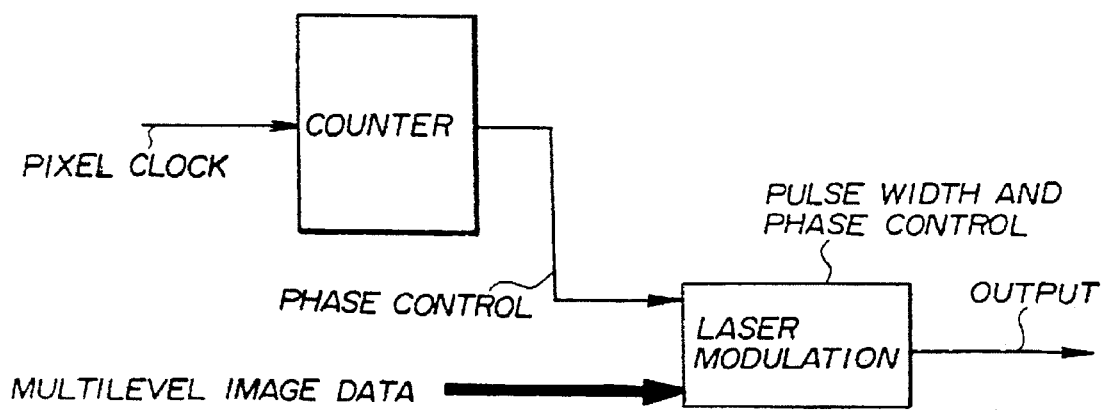
FIG. 30 is a diagram showing a method of laser light modulation in accordance with the period of basic dot occurrence of the dot image.

FIG. 30 shows a laser light modulation unit for producing the laser pulse signals shown in FIG. 29C. In the unit shown in FIG. 30, a counter for counting pixel clock signals is provided. The counter detects the interval of recording dots in the dot image, and the detected information is attached to a phase control signal. This phase control signal is supplied from the counter to the laser light modulation unit so that the start point of laser light irradiation within one dot is adjusted in accordance with the interval of recording dots in the dot image as shown in FIG. 29C.

Figures 31, 32:
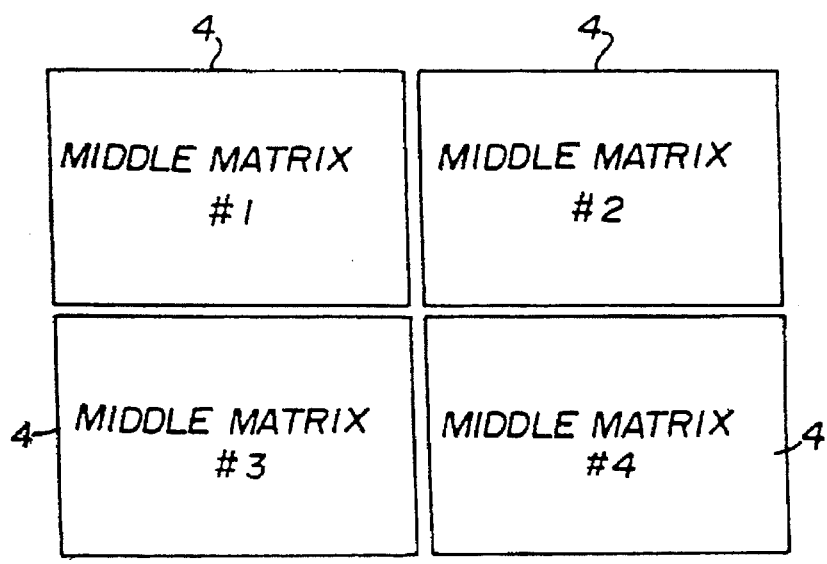
FIG. 31 is a diagram showing a multi-structure dither matrix pattern of 8×8 elements used by a third embodiment of the present invention.
FIG. 32 is a diagram showing four middle matrix patterns which are arranged in the matrix pattern shown in FIG. 31.

FIG. 31 shows a multi-structure dither matrix pattern used by a third embodiment of the present invention. Similarly to the above embodiments, the dither matrix pattern is made up of a parent matrix pattern 1 indicated by a thick line in FIG. 31, four middle matrix patterns 2 indicated by a dotted line in FIG. 31, and a plurality of basic matrix patterns 3.

The parent matrix pattern 1 contains 8×8 threshold values which are used to determine the number of tone levels of an output image. One dot of the output image is represented with 64 tone levels by using the parent matrix pattern 1. Each middle matrix pattern 2 contains 4×4 threshold values from among the 64 threshold values of the parent matrix pattern 1, and the middle matrix pattern 2 is used to determine the resolution of the output image. Each basic matrix pattern 3 contains one threshold value from among the 64 threshold values of the parent matrix pattern 1 which is used to determine the gradation of a single pixel of one dot of the output image. One dot of the output image is represented with two tone levels.

FIG. 32 shows four middle matrix patterns arranged in the multi-structure dither matrix pattern shown in FIG. 31. In FIG. 32, two middle matrix patterns #1, #2 of 4×4 elements and two middle matrix patterns #3, #4 of 4×4 elements are arranged in two lines, and the two middle matrix patterns #1, #3 and the two middle matrix patterns #2, #4 are arranged in two rows.

FIGS. 33 through 36 show four 8×8 dither matrix patterns for each of the basic colors such as black, cyan, magenta and yellow, and each of these patterns is arranged from the parent dither matrix pattern shown in FIG. 31. A dither matrix pattern for black is shown in FIG. 33, and the pattern in FIG. 33 is the same as that in FIG. 31. A dither matrix pattern used for producing a cyan image is shown in FIG. 34, and the dither matrix pattern for cyan is produced by reading the dither matrix pattern stored in the dither matrix memory and replacing the middle matrix patterns #1 and #2 with the middle matrix patterns #3 and #4. A dither matrix pattern used for producing a magenta image is shown in FIG. 35, and the dither matrix pattern for magenta is produced by retrieving the dither matrix pattern stored in the dither matrix memory and replacing the middle matrix patterns #1 and #3 with the middle matrix patterns #2 and #4. A dither matrix pattern used for producing a yellow image is shown in FIG. 36, and the dither matrix pattern for yellow is produced by retrieving the dither matrix pattern stored in the dither matrix memory and replacing the middle matrix patterns #1 and #3 with the middle matrix patterns #4 and #2.

As previously described, the input image signal relating to one pixel is compared by the comparator 34 with a threshold value supplied from the dither matrix memory 31. The multi-structure dither matrix pattern in FIG. 31 is stored in a dither matrix memory 31 as shown in FIG. 8, and the dither matrix memory 31 is, for example, a read only memory (ROM). According to the present invention, the dither matrix patterns for the basic colors shown in FIGS. 33–36 are arranged by storing the dither matrix pattern in FIG. 31 in the dither matrix memory 31 and changing the start address of reading the memory 31 for each of the basic colors so as to produce the dither matrix patterns for the basic colors. The start address of the retrieval of the dither matrix memory 31 is changed, for each of the basic colors, in accordance with the offset data supplied to the register 32.

Figures 41, 42:
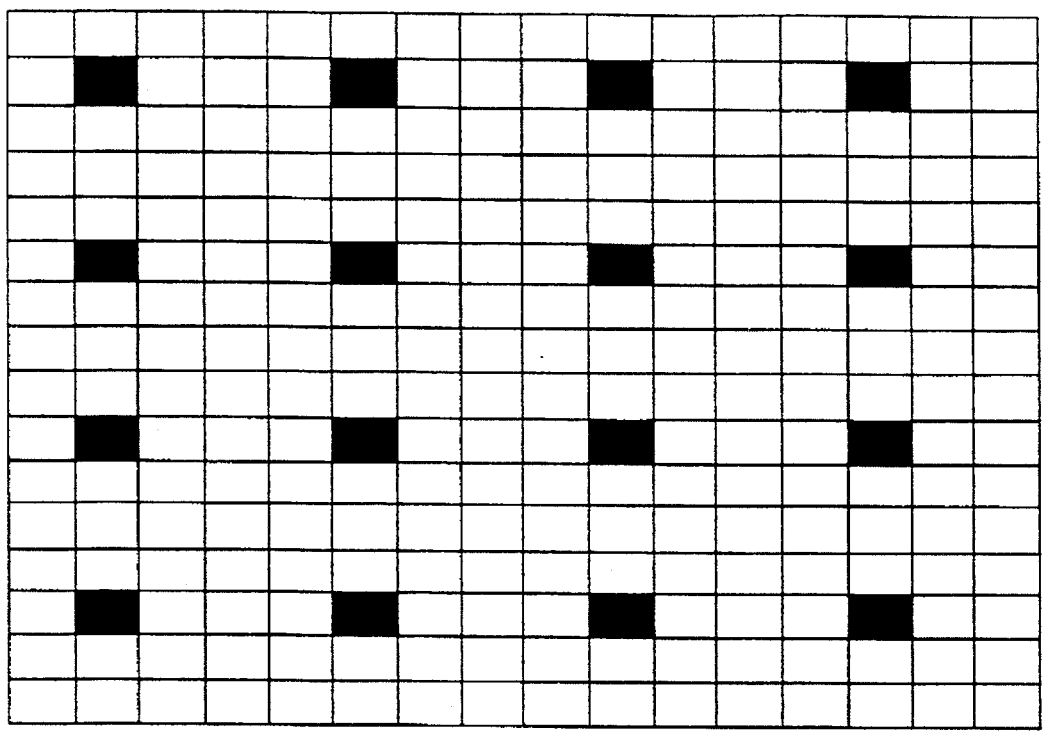

FIGS. 37 through 40 respectively show examples of black, cyan, magenta and yellow dot images which are produced when an input image data with a low density is processed by using the dither matrix patterns in FIGS. 33 through 36. For example, the black dot image in FIG. 37 contains black dots which are located where the input image data relating to one pixel is detected as not greater than any of threshold values "1", "2" and "3" from the dither matrix pattern in FIG. 33. In a manner similar to the manner of the black dot image mentioned above, the cyan dot image, the magenta dot image and the yellow dot image in FIGS. 38, 39 and 40 contain high-gradation dots for each of the three basic colors. FIG. 41 shows a color image which is produced by overprinting the four-color dot images shown in FIGS. 37–40. In the image in FIG. 41, black dots are located where the input image data relating to one pixel is detected as not greater than the corresponding one of the threshold values from the dither matrix pattern.

Figures 45, 46:
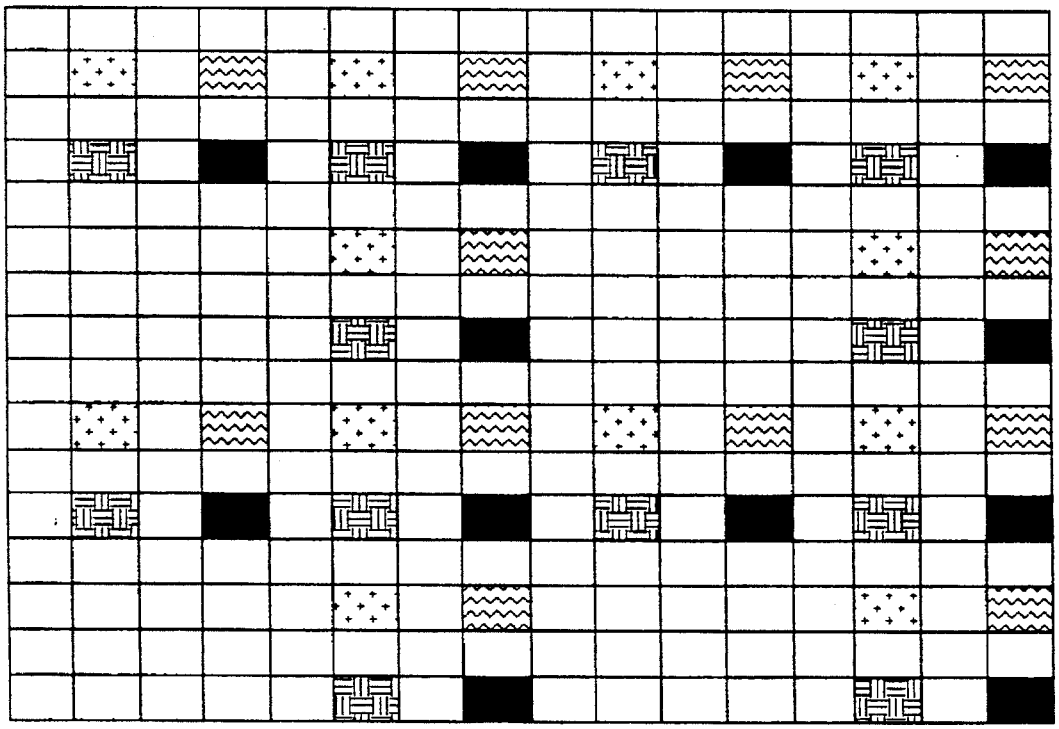

Next, a description will be given of the difference between the present invention and the prior art. In contrast with the present invention described above, FIGS. 42 through 45 respectively show examples of black, cyan, magenta and yellow dot images when an input image data with a low density is processed by using the conventional dither matrix patterns. For example, the black dot image in FIG. 42 contains black dots which are located where the input image data relating to one pixel is detected as not greater than any of threshold values "1", "2" and "3" from the dither matrix pattern. In a manner similar to the manner of the above black dot image, the cyan dot image, the magenta dot image and the yellow dot image in FIGS. 43, 44 and 45 contain high-gradation dots for each of the three basic colors. FIG. 46 shows a color image which is produced by overprinting the four-color dot images shown in FIGS. 42–45. In the color image in FIG. 46, black dots are located where the input image data relating to one pixel is detected as not greater than the corresponding one of the threshold values from the dither matrix pattern.

FIGS. 47 through 50 respectively show four conventional 8×8 dither matrix patterns for each of the basic colors such as black, cyan, magenta and yellow. The dither matrix patterns for cyan, magnet and yellow shown in FIGS. 48–50 are arranged so that threshold values contained in the dither matrix patterns are different from each other. Only the dither matrix pattern for black shown in FIG. 47 is the same as the dither matrix pattern of the present invention shown in FIG. 33.

In the conventional case mentioned above, threshold values of the dither matrix patterns used to determine the resolution are shifted such that color dots for the basic colors relating to one pixel do not overlap in the output image. For example, threshold values of the dither matrix pattern shown in FIG. 48 are arranged by shifting the threshold values of the pattern in FIG. 47 by two rows. Threshold values of the dither matrix pattern shown in FIG. 49 are arranged by shifting the threshold values of the pattern in FIG. 47 by two columns. Threshold values of the dither matrix pattern shown in FIG. 50 are arranged by shifting the threshold values of the pattern in FIG. 47 by two rows and further shifting them by two columns.

FIG. 46 shows a color image which is produced by overprinting the four-color dot images shown in FIGS. 42–45. In the color image shown in FIG. 46, color dots in low-density areas of an output image dot overlap with each other, so as to reproduce a high-quality color image.

However, although a high-quality color image can be formed on a photosensitive drum of an electrophotographic printing system after an image forming process is performed, an output image printed on paper may have non-smooth gradation areas or the gradation thereof may become unstable when the color dots (the toners for the basic colors) do not overlap with each other as shown in FIG. 46.

Figure 51:
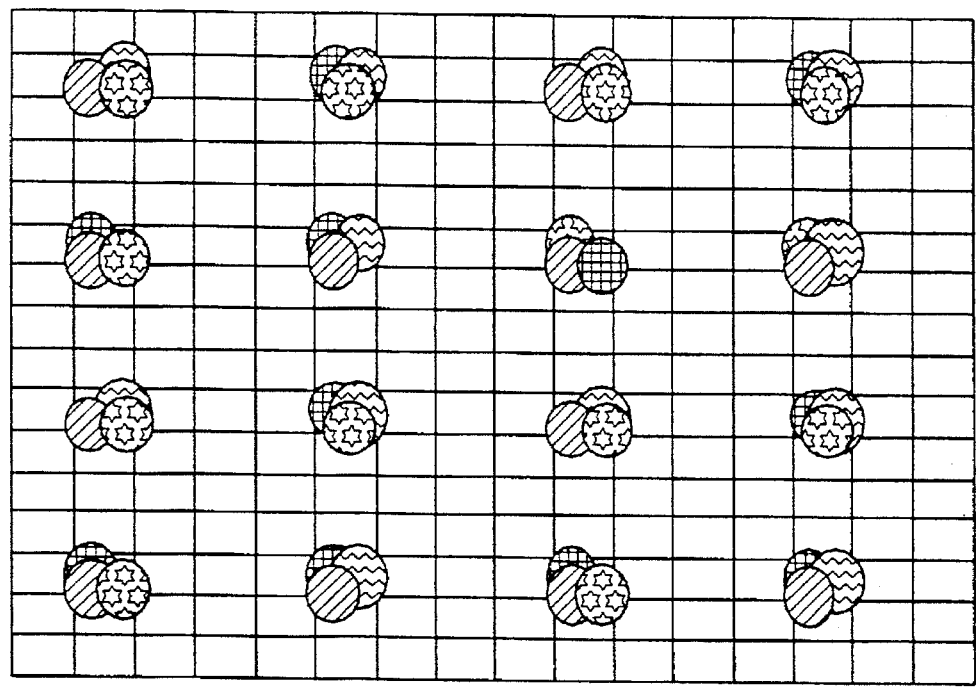
FIG. 51 is a diagram showing an output color image in which the dot image shown in FIG. 41 is represented with color toners.

According to the present invention, an output color image (the printed matter) can have smooth gradation areas as the color dots (the toners for the basic colors) overlap with each other as shown in FIG. 41. FIG. 51 shows an output color image in which the dot image shown in FIG. 41 is represented with color toners by the image processing method of the present invention.

When the dot image shown in FIG. 46 is represented with color toners, it is likely that the toners for the basic colors dot not gather at one dot and an isolated dot will be produced.

Figure 52:
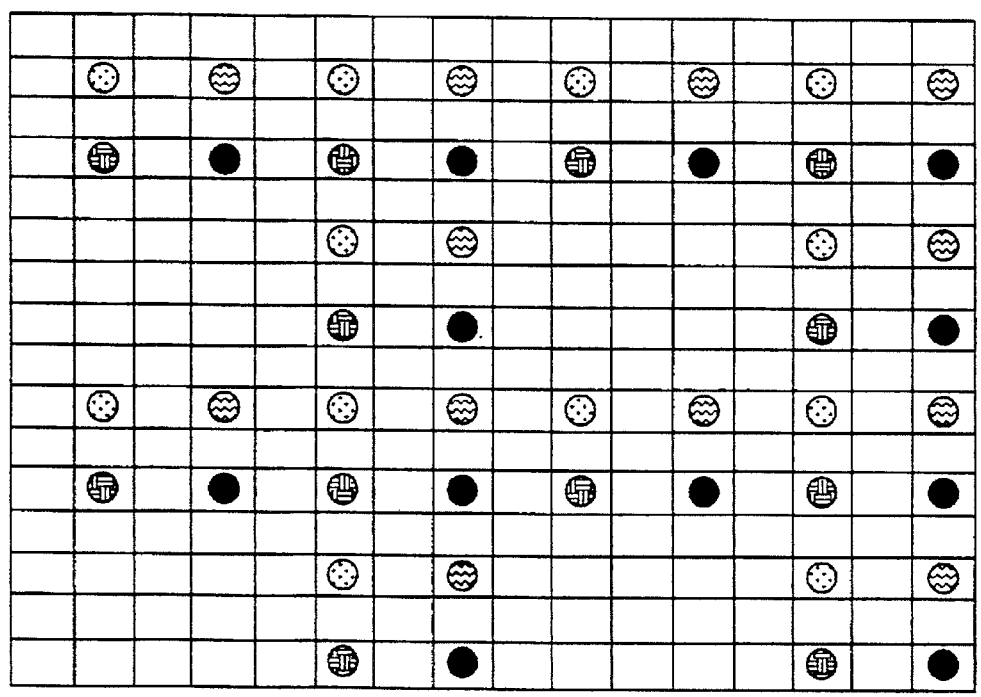
FIG. 52 is a diagram showing an output color image in which the dot image shown in FIG. 46 is represented with color toners.

Also, it is likely that non-smooth gradation areas may appear in the output color image. FIG. 52 shows an output color image in which the dot image shown in FIG. 46 is represented with color toners.

Further, the present invention is not limited to the above described embodiments, and variations and modifications may be made without departing from the scope of the present invention.

What is claimed is:

1. A method for processing digital image data of a multilevel input image by using a threshold matrix pattern to produce a multilevel output image by halftone image representation, said method comprising:

providing a single multi-structure dither matrix having a first dither matrix pattern to produce a multilevel image by halftone image representation, said first dither matrix pattern having a plurality of threshold values, said first dither matrix pattern being stored in a storage memory, each threshold value being retrievable from the storage memory at a specified address, so that a gradation number of the multilevel output image ranges from zero to a total number of said threshold values contained in said first dither matrix pattern;

defining a size of each of a plurality of second matrix patterns based on said first dither matrix pattern, said first dither matrix pattern being divided into the plurality of second matrix patterns each of which includes a partial set of the plurality of threshold values and has said defined size, so that a line density of the multilevel output image is determined as a resolution based on the size of each second matrix pattern;

reading one of a plurality of basic matrix patterns from the storage memory in synchronism with a pixel clock signal, each of said second matrix patterns further including a plurality of basic matrix patterns, each of said basic matrix patterns including a portion of said threshold values stored at contiguous addresses in the storage memory said threshold values relating to one pixel of the multilevel input image;

comparing the digital image data relating to one pixel with the threshold values of a corresponding basic matrix pattern read from the storage memory to produce a multilevel image signal based on the result of the comparison; and outputting the multilevel image signal relating to one dot to a printing unit, so that each dot of the multilevel output image is represented by a plurality of tone levels, the number of said tone levels being determined by the number of threshold values contained in each basic matrix pattern.

2. A method according to claim 1, wherein a different retrieval process is selected from among a plurality of predetermined retrieval processes for retrieving threshold data from said storage memory for each of basic colors including cyan, magenta and yellow, so that screen angles of multilevel output images of the basic colors are different from each other.

3. A method for processing digital image data of a multilevel input image by using a threshold matrix pattern to produce a multilevel output image by halftone image representation, said method comprising:

providing a first matrix pattern having a plurality of threshold values, said first matrix pattern being stored in a storage memory, each threshold value being retrievable from the storage memory at a specified address, so that a gradation number of the multilevel output image ranges from zero to a total number of said threshold values contained in said first matrix pattern;

defining a size of each of a plurality of second matrix patterns based on a predetermined area of said first matrix pattern, said first matrix pattern being divided into the plurality of second matrix patterns each of which includes a partial set of the plurality of threshold values and has said defined size, so that a line density of the multilevel output image is determined based on the size of each second matrix pattern;

reading one of a plurality of basic matrix patterns from the storage memory in synchronism with a pixel clock signal, each of said second matrix patterns being divided into said plurality of basic matrix patterns, each of said basic matrix patterns including threshold values, which are part of said threshold values of said first matrix pattern, and relating to one pixel of the multilevel input image;

comparing the digital image data relating to one pixel with the threshold values of a corresponding basic matrix pattern read from the storage memory to produce a multilevel image signal based on the result of the comparison; and outputting the multilevel image signal relating to one dot to a printing unit, so that each dot of the multilevel output image is represented by a plurality of tone levels, the number of said tone levels being determined by the number of threshold values contained in each basic matrix pattern;

wherein a different retrieval process is selected from among a plurality of predetermined retrieval processes for retrieving threshold data from said storage memory for each of basic colors including cyan, magenta and yellow, so that screen angles of multilevel output images of the basic colors are different from each other; and wherein said plurality of predetermined retrieval processes include a retrieval process in which the digital image data relating to one pixel is compared to two or more threshold values arrayed in a horizonal direction of the first matrix pattern, thereby increasing a line density of the multilevel output image in a vertical direction thereof.

4. A method for processing digital image data of a multilevel input image by using a threshold matrix pattern to produce a multilevel output image by halftone image representation, said method comprising:

providing a first matrix pattern having a plurality of threshold values, said first matrix pattern being stored in a storage memory, each threshold value being retrievable from the storage memory at a specified address, so that a gradation number of the multilevel output image ranges from zero to a total number of said threshold values contained in said first matrix pattern;

defining a size of each of a plurality of second matrix patterns based on a predetermined area of said first matrix pattern, said first matrix pattern being divided into the plurality of second matrix patterns each of which includes a partial set of the plurality of threshold values and has said defined size, so that a line density of the multilevel output image is determined based on the size of each second matrix pattern;

reading one of a plurality of basic matrix patterns from the storage memory in synchronism with a pixel clock signal, each of said second matrix patterns being divided into said plurality of basic matrix patterns, each of said basic matrix patterns including threshold values, which are part of said threshold values of said first matrix pattern, and relating to one pixel of the multilevel input image;

comparing the digital image data relating to one pixel with the threshold values of a corresponding basic matrix pattern read from the storage memory to produce a multilevel image signal based on the result of the comparison; and outputting the multilevel image signal relating to one dot to a printing unit, so that each dot of the multilevel output image is represented by a plurality of tone levels, the number of said tone levels being determined by the number of threshold values contained in each basic matrix pattern;

wherein a different retrieval process is selected from among a plurality of predetermined retrieval processes for retrieving threshold data from said storage memory for each of basic colors including cyan, magenta and yellow, so that screen angles of multilevel output images of the basic colors are different from each other; and wherein said plurality of predetermined retrieval processes include a retrieval process in which the digital image data relating to one pixel is compared with two or more threshold values arrayed in a vertical direction of the first matrix pattern, thereby increasing a line density of the multilevel output image in a horizontal direction thereof.

5. A method according to claim 1, wherein said reading step, said comparing step and said outputting step are repeatedly performed for basic colors including cyan, magenta and yellow, to overprint multilevel output images of the basic colors in accordance with multilevel image signals output for the basic colors respectively, so that a color multilevel image is recorded.

6. A method for processing digital image data of a multilevel input image by using a threshold matrix pattern to produce a multilevel output image by halftone image representation, said method comprising:

providing a first matrix pattern having a plurality of threshold values, said first matrix pattern being stored in a storage memory, each threshold value being retrievable from the storage memory at a specified address, so that a gradation number of the multilevel output image ranges from zero to a total number of said threshold values contained in said first matrix pattern;

defining a size of each of a plurality of second matrix patterns based on a predetermined area of said first matrix pattern, said first matrix pattern being divided into the plurality of second matrix patterns each of which includes a partial set of the plurality of threshold values and has said defined size, so that a line density of the multilevel output image is determined based on the size of each second matrix pattern;

reading one of a plurality of basic matrix patterns from the storage memory in synchronism with a pixel clock signal, each of said second matrix patterns being divided into said plurality of basic matrix patterns, each of said basic matrix patterns including threshold values, which are part of said threshold values of said first matrix pattern, and relating to one pixel of the multilevel input image;

comparing the digital image data relating to one pixel with the threshold values of a corresponding basic matrix pattern read from the storage memory to produce a multilevel image signal based on the result of the comparison; and outputting the multilevel image signal relating to one dot to a printing unit, so that each dot of the multilevel output image is represented by a plurality of tone levels, the number of said tone levels being determined by the number of threshold values contained in each basic matrix pattern;

wherein:
1) said reading step, said comparing step and said outputting step are repeatedly performed for basic colors including cyan, magenta and yellow, to overprint multilevel output images of the basic colors in accordance with multilevel image signals output for the basic colors respectively, so that a color multilevel image is recorded;
2) a threshold matrix pattern for one of the basic colors is formed from said fist matrix pattern by replacing half of the second matrix patterns arrayed in lines with the remaining second matrix patterns in the remaining lines in a rotational manner;
3) a threshold matrix pattern for another basic color is formed from the first matrix pattern by replacing half of the second matrix patterns arrayed in rows with the remaining second matrix patterns in the remaining rows in a rotational manner; and
4) a threshold matrix pattern for the remaining basic color is formed from the first matrix pattern by replacing half of the second matrix patterns arrayed in lines with the remaining second matrix patterns in the remaining lines and by further replacing half of the second matrix patterns arrayed in rows with the remaining second matrix patterns in the remaining rows in a rotational manner.

7. A method according to claim 1, further comprising the steps of:

supplying a different phase control signal to a laser light modulation unit for each of basic colors including cyan, magenta and yellow; and outputting a control signal relating to one dot from said laser light modulation unit based on the multilevel image signal and the phase control signal, so that each dot of the multilevel output image is recorded based on said control signal.

8. A method according to claim 7, wherein a start position of laser light irradiation to a photosensitive medium within one dot is adjusted based on the phase control signal, so that the start positions of the basic colors relating to one dot are different from each other.

9. A method according to claim 7, wherein the start position of laser light irradiation to the photosensitive medium within one dot is adjusted by means of a counter for counting sync signals for each color plane.

10. An apparatus for processing digital image data of an image by using a threshold matrix pattern to produce a multilevel output image by halftone image representation, said apparatus comprising:

a) memory means for storing a single multi-structure dither matrix having a first dither matrix pattern to produce a multilevel image by halftone image representation, wherein:
1) said first dither matrix pattern has a plurality of threshold values,
2) each threshold value is read out from the memory means at a specified address so that the ratio of recording dots to non-recording dots in a unit area is capable of being changed within a range from 0 to the number of said plurality of threshold values, 3) said range defines a gradation number of the multilevel output image, 4) said first matrix pattern includes a plurality of second matrix patterns, 5) each said matrix pattern has threshold values from among the plurality of threshold values and defines an area of predetermined size for resolution used to determine a line density of the multilevel output image, 6) each second matrix pattern includes a plurality of basic matrix patterns stored at contiguous memory locations of said memory means, and 7) each of said basic matrix patterns corresponds to one pixel of the image and has two or more threshold values from among the plurality of threshold values;

b) counter means for counting a pixel clock signal and for outputting an address signal indicating a specified address of said memory means, said address signal being produced by adding an offset data to the counted pixel clock signal;

c) reading means for reading a threshold value of said first dither matrix pattern from said memory means at the specified address output by said counter means;

d) comparator means for comparing the digital image data relating to one pixel with two or more threshold values of said of said basic matrix patterns from said memory means by said reading means, and for outputting a multilevel image signal based on the result of the comparison; and e) control means for controlling a laser light pulse width relating to one dot in accordance with the multilevel image signal output by said comparator means.

11. An apparatus according to claim 10, further comprising register means for supplying different offset data to said counter means for each of basic colors including cyan, magenta and yellow, so as to change a start address at which the threshold data is read from the memory means for each basic color.

12. The method of claim 1, wherein the storage memory is a read only memory (ROM).

13. The apparatus of claim 10, wherein the memory means is a read only memory (ROM).

* * * * *

UNITED STATES PATENT AND TRADEMARK OFFICE
CERTIFICATE OF CORRECTION

PATENT NO. : 5,642,439
DATED : June 24, 1997
INVENTOR(S) : Kei Sato and Noboru Murayama It is certified that error appears in the above-identified patent and that said Letters Patent is hereby corrected as shown below:

Column 14, line 10, change "in in" to --in--.

Column 20, line 18, change "fist" to --first--.

Column 22, line 6, change "of said of said" to --of said--.

Signed and Sealed this

Sixteenth Day of December, 1997

Attest:

BRUCE LEHMAN

*Attesting Officer*   *Commissioner of Patents and Trademarks*